(12) United States Patent
Shin et al.

(10) Patent No.: US 8,918,224 B2
(45) Date of Patent: Dec. 23, 2014

(54) POWER MANAGEMENT APPARATUS, POWER MANAGEMENT SYSTEM INCLUDING THE POWER MANAGEMENT APPARATUS, AND METHOD FOR CONTROLLING THE POWER MANAGEMENT SYSTEM

(75) Inventors: Jong Hyun Shin, Suwon-si (KR); Jae Hwi Jang, Yongin-si (KR); Hyun Soo Park, Seoul (KR); Young Jin Park, Bucheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 296 days.

(21) Appl. No.: 13/064,919

(22) Filed: Apr. 26, 2011

(65) Prior Publication Data

US 2012/0101652 A1 Apr. 26, 2012

(30) Foreign Application Priority Data

Oct. 25, 2010 (KR) ........................ 10-2010-0103961

(51) Int. Cl.
*H02J 3/14* (2006.01)
(52) U.S. Cl.
CPC ........ *H02J 3/14* (2013.01); *Y04S 20/224* (2013.01); *Y04S 20/222* (2013.01); *H02J 2003/143* (2013.01); *H02J 2003/146* (2013.01); *Y02B 70/3266* (2013.01); *Y04S 20/242* (2013.01); *Y02B 70/3225* (2013.01)
USPC ........... 700/296; 700/295; 700/291; 700/297; 700/286
(58) Field of Classification Search
None
See application file for complete search history.

(56) References Cited

U.S. PATENT DOCUMENTS

| | | | | |
|---|---|---|---|---|
| 5,019,977 A * | 5/1991 | LaPointe et al. | .................. | 702/3 |
| 5,430,430 A * | 7/1995 | Gilbert | ..................... | 340/870.02 |
| 6,301,674 B1 * | 10/2001 | Saito et al. | ..................... | 713/340 |
| 6,786,421 B2 * | 9/2004 | Rosen | .............................. | 236/94 |
| 7,130,719 B2 * | 10/2006 | Ehlers et al. | .................. | 700/276 |
| 7,317,404 B2 * | 1/2008 | Cumeralto et al. | ...... | 340/870.02 |
| 7,343,226 B2 * | 3/2008 | Ehlers et al. | .................. | 700/276 |
| 7,364,093 B2 * | 4/2008 | Garozzo | ..................... | 236/46 R |
| 7,373,222 B1 * | 5/2008 | Wright et al. | ................. | 700/295 |
| 7,379,791 B2 * | 5/2008 | Tamarkin et al. | ............. | 700/286 |
| 7,379,997 B2 * | 5/2008 | Ehlers et al. | .................. | 709/224 |
| 7,561,977 B2 * | 7/2009 | Horst et al. | ..................... | 702/62 |
| 7,661,603 B2 * | 2/2010 | Yoon et al. | ...................... | 236/51 |
| 7,873,441 B2 * | 1/2011 | Synesiou et al. | .............. | 700/286 |
| 8,069,417 B2 * | 11/2011 | Brush et al. | ..................... | 715/764 |
| 8,091,795 B1 * | 1/2012 | McLellan et al. | .............. | 236/51 |
| 8,178,997 B2 * | 5/2012 | Talkin et al. | .................... | 307/41 |
| 8,185,245 B2 * | 5/2012 | Amundson et al. | ........... | 700/277 |
| 8,306,668 B2 * | 11/2012 | Tamarkin et al. | ............. | 700/286 |

(Continued)

*Primary Examiner* — Kavita Padmanabhan
*Assistant Examiner* — Christopher E Everett
(74) *Attorney, Agent, or Firm* — Staas & Halsey LLP

(57) ABSTRACT

A power management apparatus includes a communication unit to receive power rate information from a power provider and receive power consumption information and reservation information from an electric device, and a controller to decide an operation order on the basis of power consumption information and reservation information of the electric device, perform scheduling to decide an operation start time on the basis of the power rate information and reservation information in the operation order, and control an operation time of the electric device on the basis of the scheduling result. As a result, the power management apparatus performs optimum scheduling of an electric device using power rate information provided from the power provider, and power consumption information and reservation information of the electric device, resulting in an increase in user satisfaction.

40 Claims, 16 Drawing Sheets

| OPERATION MODE | MAXIMUM INSTANTANEOUS POWER(kW) | AVERAGE POWER CONSUMPTION(kW) | POWER CONSUMPTION TIME (min) | OPERATION ALGORITHM |
|---|---|---|---|---|
| FIRST MODE | 1.5 | 1.13 | 200 | Full Wash/Rinse FUNCTION<br>Full Spin Dry FUNCTION<br>Full Heat Dry FUNCTION |
| SECOND MODE | 0.23 | 0.14 | 120 | Full Wash/Rinse FUNCTION<br>Full Spin Dry FUNCTION |
| THIRD MODE | 0.21 | 0.11 | 80 | Full Wash/Rinse FUNCTION<br>Simple Spin Dry FUNCTION |

(56) References Cited

U.S. PATENT DOCUMENTS

| | | | |
|---|---|---|---|
| 8,355,826 B2* | 1/2013 | Watson et al. | 700/291 |
| 8,369,998 B2* | 2/2013 | Drake et al. | 700/295 |
| 8,417,393 B2* | 4/2013 | Drake et al. | 700/296 |
| 2002/0024332 A1* | 2/2002 | Gardner | 324/103 R |
| 2004/0117330 A1* | 6/2004 | Ehlers et al. | 705/412 |
| 2004/0139038 A1* | 7/2004 | Ehlers et al. | 705/412 |
| 2007/0043478 A1* | 2/2007 | Ehlers et al. | 700/276 |
| 2007/0176933 A1* | 8/2007 | Culpi et al. | 345/440.2 |
| 2007/0239477 A1* | 10/2007 | Budike | 705/1 |
| 2008/0167756 A1* | 7/2008 | Golden et al. | 700/297 |
| 2008/0281473 A1* | 11/2008 | Pitt | 700/291 |
| 2009/0063257 A1* | 3/2009 | Zak et al. | 705/10 |
| 2009/0187499 A1* | 7/2009 | Mulder et al. | 705/30 |
| 2009/0231342 A1* | 9/2009 | Smith et al. | 345/440 |
| 2010/0064001 A1* | 3/2010 | Daily | 709/203 |
| 2010/0088261 A1* | 4/2010 | Montalvo | 706/15 |
| 2010/0092625 A1* | 4/2010 | Finch et al. | 426/231 |
| 2010/0145535 A1* | 6/2010 | Tyler et al. | 700/292 |
| 2010/0174668 A1* | 7/2010 | Finch et al. | 705/412 |
| 2010/0187219 A1* | 7/2010 | Besore et al. | 219/494 |
| 2010/0324962 A1* | 12/2010 | Nesler et al. | 705/8 |
| 2011/0062142 A1* | 3/2011 | Steurer | 219/483 |
| 2011/0066300 A1* | 3/2011 | Tyagi et al. | 700/291 |
| 2011/0078622 A1* | 3/2011 | Missig et al. | 715/784 |
| 2011/0095017 A1* | 4/2011 | Steurer | 219/493 |
| 2011/0106328 A1* | 5/2011 | Zhou et al. | 700/291 |
| 2011/0114627 A1* | 5/2011 | Burt | 219/396 |
| 2011/0118890 A1* | 5/2011 | Parsons | 700/295 |
| 2011/0148390 A1* | 6/2011 | Burt et al. | 323/318 |
| 2011/0172846 A1* | 7/2011 | Kulyk et al. | 700/296 |
| 2011/0184579 A1* | 7/2011 | Nilsen et al. | 700/295 |
| 2011/0191220 A1* | 8/2011 | Kidston et al. | 705/34 |
| 2011/0218690 A1* | 9/2011 | O'Callaghan et al. | 700/295 |
| 2011/0290781 A1* | 12/2011 | Burt et al. | 219/396 |
| 2012/0120306 A1* | 5/2012 | Schindler et al. | 348/372 |
| 2012/0296488 A1* | 11/2012 | Dharwada et al. | 700/296 |

* cited by examiner

FIG. 3

| DEVICE ID | RESERVATION REGISTRATION TIME | DESIRED OPERATION COMPLETION TIME | OPERATION PRIORITY (OP) | NOTES |
|---|---|---|---|---|
| 1 | 10AM 9 OCTOBER 2010 | 9AM 9 OCTOBER 2010 | 0.3 | ID:1 → IN THE WASHING MACHINE, RESERVATION REGISTRATION TIME IS 10AM, DESIRED OPERATION COMPLETION TIME IS 9AM OF THE NEXT DAY, AND OPERATION PRIORITY (OP) IS 0.3, SO THAT ACTUAL OPERATION START TIME IS DECIDED IN LOWER POWER RATE LEVEL. |
| 2 | 07:25PM 9 OCTOBER 2010 | 4PM 9 OCTOBER 2010 | 0.9 | ID:2 → IN THE AIR-CONDITIONER, RESERVATION REGISTRATION TIME IS 07:25PM OF EACH DAY, DESIRED OPERATION COMPLETION TIME IS 4PM OF THE NEXT DAY, AND OPERATION PRIORITY (OP) IS 0.9, SO THAT ACTUAL OPERATION START TIME IS DECIDED FROM AMONG LOW, MEDIUM AND HIGH POWER RATE LEVELS. |

FIG. 5A

| OPERATION MODE | MAXIMUM INSTANTANEOUS POWER(kW) | AVERAGE POWER CONSUMPTION(kW) | POWER CONSUMPTION TIME (min) | OPERATION ALGORITHM |
|---|---|---|---|---|
| FIRST MODE | 1.5 | 1.13 | 200 | Full Wash/Rinse FUNCTION<br>Full Spin Dry FUNCTION<br>Full Heat Dry FUNCTION |
| SECOND MODE | 0.23 | 0.14 | 120 | Full Wash/Rinse FUNCTION<br>Full Spin Dry FUNCTION |
| THIRD MODE | 0.21 | 0.11 | 80 | Full Wash/Rinse FUNCTION<br>Simple Spin Dry FUNCTION |

FIG. 5B

| OPERATION MODE | MAXIMUM INSTANTANEOUS POWER(kW) | AVERAGE POWER CONSUMPTION(kW) | POWER CONSUMPTION TIME (min) | OPERATION ALGORITHM |
|---|---|---|---|---|
| FIRST MODE | 3.4 | 3.23 | NA | INDOOR UNIT K1 FILTER NORMAL OPERATION<br>INDOOR UNIT SP1 UNIT NORMAL OPERATION<br>OUTDOOR UNIT FREQUENCY 100% OPERATION (85Hz) |
| SECOND MODE | 3.01 | 2.86 | NA | INDOOR UNIT K1 FILTER NORMAL OPERATION<br>INDOOR UNIT SP1 UNIT NORMAL OPERATION<br>OUTDOOR UNIT FREQUENCY 84% OPERATION (75Hz) |
| THIRD MODE | 2.5 | 2.23 | NA | INDOOR UNIT STOPS OPERATION<br>60% OPERATION (55Hz) OF OUTDOOR UNIT FREQUENCY |
| FOURTH MODE | 1.4 | 1.21 | NA | INDOOR UNIT STOPS OPERATION<br>40% OPERATION (30Hz) OF OUTDOOR UNIT FREQUENCY |

POWER MANAGEMENT APPARATUS, POWER MANAGEMENT SYSTEM INCLUDING THE POWER MANAGEMENT APPARATUS, AND METHOD FOR CONTROLLING THE POWER MANAGEMENT SYSTEM

CROSS-REFERENCE TO RELATED APPLICATIONS

This application claims the benefit of Korean Patent Application No. 2010-0103961, filed on Oct. 25, 2010 in the Korean Intellectual Property Office, the disclosure of which is incorporated herein by reference.

BACKGROUND

1. Field

Embodiments relate to a power management apparatus for controlling an electric device, a power management system including the power management apparatus, and a method for controlling the power management system.

2. Description of the Related Art

With the development of Information Technology (IT), the number of household appliances powered by electricity is rapidly increasing, in turn leading to increasing power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A state in which a high power demand is required for a short time is called peak load. During periods of peak load, electricity costs the most to generate and deliver, and therefore power providers raise the power rate charged to consumers during periods of peak load. Construction costs for adding an additional power plant to the grid are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop an air-conditioner so as to reduce power consumption when power rates are high.

By means of the DR, a power-supply source can alter user power consumption to achieve load balancing and can restrict user power consumption to periods when demand is low, thereby reducing the user's overall energy expenditure.

Therefore, electric devices to which demand response (DR) is applied have been developed. The electric devices receive real-time power rates from the power-supply source, and are turned on or off on the basis of the received power rates. Such electric devices are not always operated at a time desired by the user, thus causing the user considerable inconvenience.

In addition, if the electric device is always operated at a time scheduled by the user, the electric device has a disadvantage in that it is operated using only reservation information without considering power rates.

SUMMARY

Therefore, it is an aspect to provide a power management apparatus for scheduling the operation of an electric device on the basis of power rate information, power consumption information and reservation information of the electric device, a power management system including the power management apparatus, and a method for controlling the same.

It is another aspect to provide a power management apparatus for updating a blocked time of a reservation operation of an electric device on the basis of power rate information, a power management system including the power management apparatus, and a method for controlling the same.

Additional aspects will be set forth in part in the description which follows and, in part, will be apparent from the description, or may be learned by practice of the invention.

In accordance with one aspect, a power management apparatus includes a communication unit to receive power rate information from a power provider and receive power consumption information and reservation information from an electric device, and a controller to decide an operation order on the basis of power consumption information and reservation information of the electric device, perform scheduling to decide an operation start time on the basis of the power rate information and reservation information in the operation order, and control an operation time of the electric device on the basis of the scheduling result.

The reservation information may include a reservation registration time, a desired operation time, and an operation priority (OP).

The desired operation time may be any one of a desired operation completion time at which the electric device ceases operation or a desired operation start time at which the electric device begins operation.

The power consumption information may include at least one of maximum instantaneous power, average power consumption, and a power consumption time of the electric device.

The controller may decide the operation order on the basis of a reservation registration time, an operation priority (OP), average power consumption, and a power consumption time.

The controller may confirm a predetermined power rate level threshold for each operation priority (OP), confirm an operation permitted time at a time having a power rate less than the power rate level threshold to generate a time table, and decide a time closest to the desired operation time from among the time table to be an actual operation start time.

The controller may decide a power rate level corresponding to the power rate information.

The controller may establish a reservation blocked time on the basis of the power rate information.

The controller may compare maximum instantaneous power for each hour with allowed instantaneous power on the basis of the scheduling result, and determine a reservation blocked time according to the comparison result.

The power management apparatus may further include an input unit to receive reservation information of the electric device.

The power management apparatus may further include a display to display the scheduling result.

The display may include a clock window, where an edge of the clock window is displayed in a color corresponding to power rate information, and the electric device is displayed in the clock window on the basis of the scheduling result.

The display may include a clock window, where an inner region of the clock window is displayed in a color corresponding to power rate information, and the electric device is displayed at the exterior of the clock window on the basis of the scheduling result.

The display may display the electric device and an actual operation start time on the basis of the scheduling result, and allow the actual operation start time to be displayed in a color corresponding to the power rate information.

The display may display a currently-operating electric device and a currently non-operating electric device in different ways.

In accordance with another aspect, a method for controlling a power management apparatus includes receiving power rate information from a power provider, receiving and storing power consumption information and reservation information from an electric device, deciding an operation order on the basis of power consumption information and reservation information of the electric device, performing scheduling to decide an actual operation start time on the basis of the power rate information and reservation information in the operation order, and controlling an operation time of the electric device on the basis of the scheduling result.

The deciding of the operation order may include deciding an operation order on the basis of both a reservation registration time and an operation priority (OP) from among the reservation information and average power consumption and power consumption time of the power consumption information.

The deciding of the operation order on the basis of the reservation information may include deciding the operation order on the basis of the reservation registration time, the operation priority (OP), the average power consumption, and the power consumption time.

The deciding of the actual operation start time may include, if the operation priority (OP) is a maximum value, deciding a desired operation time to be an actual operation start time.

The deciding of the actual operation start time may include, if the operation priority (OP) is a minimum value, deciding a specific time having a minimum power rate to be an actual operation start time.

The deciding of the actual operation start time may include confirming a predetermined power rate threshold for each operation priority (OP), confirming a power rate less than the power rate threshold, and generating a time table according to the confirmed result, and confirming a specific time closest to a desired operation time from among the reservation information of the time table, and determining the confirmed time to be an actual operation start time.

The generating of the time table may include establishing a reservation blocked time on the basis of the power rate information, and generating the time table by excluding the reservation blocked time.

The generating of the time table may include confirming an operation blocked time of the electric device, and generating the time table by excluding the reservation blocked time.

The generating of the time table may include generating a time table by excluding a reservation blocked time in which maximum instantaneous power exceeds a predetermined allowed instantaneous power.

The generating of the time table may include, if a successive time is shorter than the power consumption time in the time table, regenerating a time table by including a power rate subsequent to a current power rate, and determining an actual operation start time in the regenerated time table.

The method may further include calculating maximum instantaneous power for each hour on the basis of the scheduling result, comparing the maximum instantaneous power with predetermined allowed instantaneous power, determining a specific time in which the maximum instantaneous power exceeds the allowed instantaneous power to be a reservation blocked time and displaying the reservation blocked time.

The method may further include determining the presence or absence of a duplicate reservation in the same time period, and if a duplicate reservation is found, displaying the duplicate reservation information.

The method may further include determining a power rate level on the basis of the received power rate information.

The method may further include, upon receiving a request signal indicating the start of operation of another electric device from the user, performing rescheduling on the basis of power consumption information of the other electric device.

The method may further include calculating a monthly accumulated electricity bill or monthly accumulated power consumption on the basis of the scheduling result, and displaying the monthly accumulated electricity bill or the monthly accumulated power consumption.

In accordance with another aspect, a power management system includes an electric device to store power consumption information, and receive reservation information as an input, and a power management apparatus which receives power rate information from a power provider, receives power consumption information and reservation information from an electric device, decides an operation order on the basis of power consumption information and reservation information of the electric device, performs scheduling to decide an operation time on the basis of the power rate information and reservation information in the operation order, and controls an operation time of the electric device on the basis of the scheduling result.

The reservation information may include a reservation registration time, a desired operation time, and an operation priority (OP), and the electric device includes an input unit to receive the desired operation time and the operation priority (OP), a controller to confirm a registration time of the reservation information, and a display to display the scheduling result.

The input unit of the electric device may receive an operation blocked time as an input.

The reservation information may include the operation mode.

The electric device may include a storage unit to store a plurality of operation algorithm information and power consumption information of individual operation modes corresponding to the individual operation algorithm information, and a controller to perform operation control using an operation algorithm corresponding to the operation mode at the actual operation start time.

The electric device may analyze a reservation information pattern on the basis of past reservation information, and display reservation information corresponding to the analyzed reservation information pattern.

The electric device may display the latest reservation information.

BRIEF DESCRIPTION OF THE DRAWINGS

These and/or other aspects of the invention will become apparent and more readily appreciated from the following description of the embodiments, taken in conjunction with the accompanying drawings of which:

FIG. 3 shows exemplary reservation information of an electric device according to an embodiment;

FIGS. 5A and 5B exemplarily show power consumption information and operation algorithm information of individual operation modes of the electric devices contained in the power management system;

DETAILED DESCRIPTION

Figure 1:
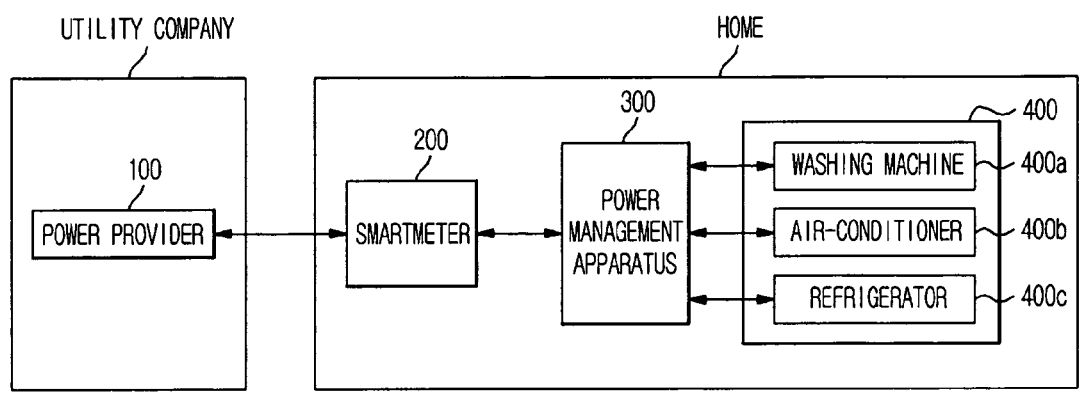
FIG. 1 is a configuration diagram illustrating a power management system including a power management apparatus according to an embodiment.

Reference will now be made in detail to the embodiments, examples of which are illustrated in the accompanying drawings, wherein like reference numerals refer to like elements throughout.

Figure 2:
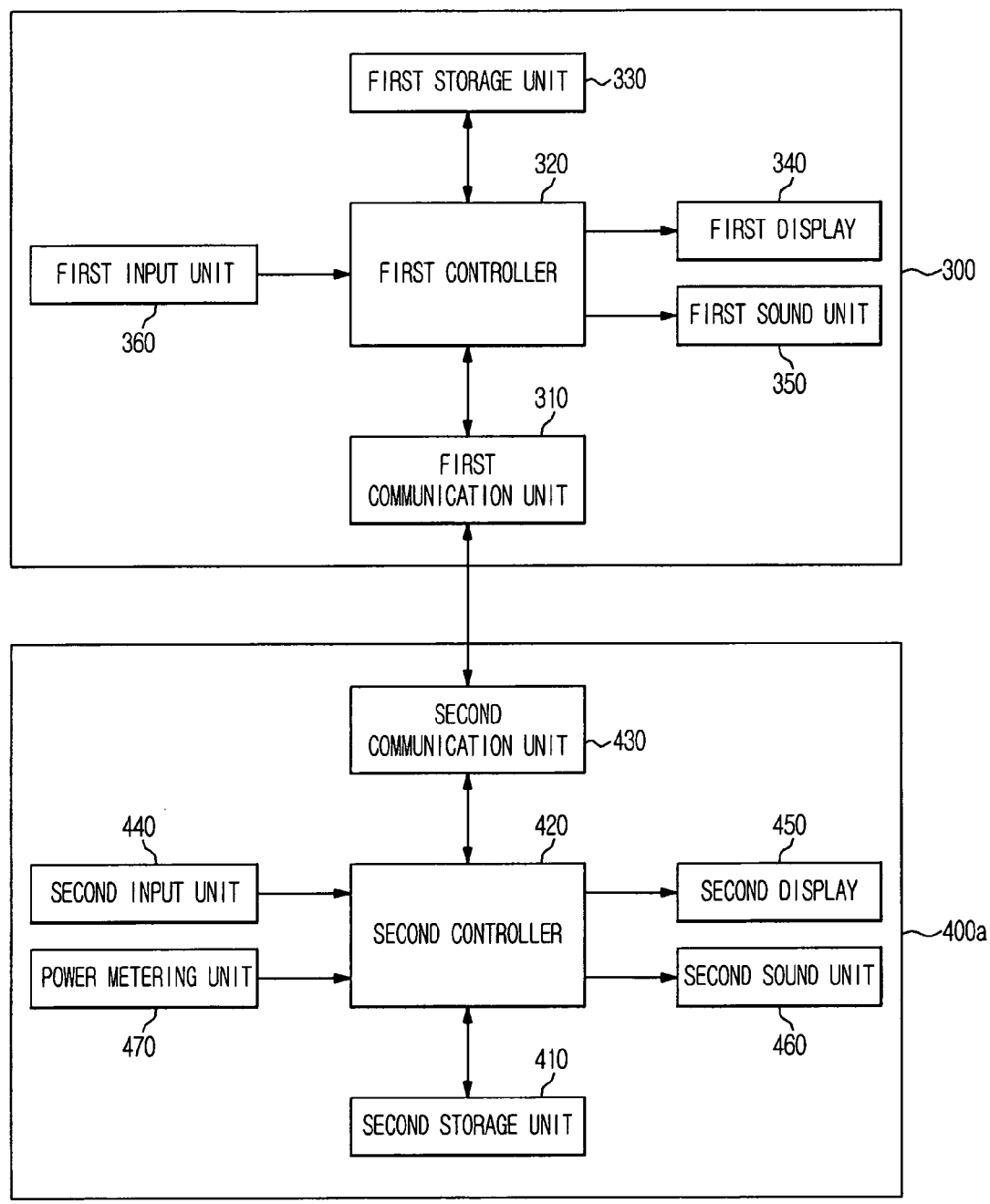
FIG. 2 is a detailed block diagram illustrating a power management apparatus contained in a power management system and an electric device according to an embodiment.

FIG. 1 is a configuration diagram illustrating a power management system including a power management apparatus according to an embodiment. FIG. 2 is a detailed block diagram illustrating a power management apparatus contained in the power management system and an electric device according to an embodiment.

Referring to FIG. 1, a power management system includes a power provider 100, a smartmeter 200, a power management apparatus 300, and an electric device 400.

The power provider 100 is used as a power supply source that is driven by a power supply company (utility company) which generates and supplies power. The power provider 100 generates the power through atomic energy, hydraulic power, geothermal power, wind power, etc., and provides the generated power to the electric device 400 installed in each home.

In this case, in relation to the power provided to the electric device installed in each home, a predetermined amount of power is generated each hour such that the generated amount of power is provided to each home. In contrast, different amounts of power are consumed in each home according to individual periods. For example, power consumption of each home in a dawn or morning period is less than that during another period such as the afternoon or dusk. In addition, power consumption of each home in spring or autumn is less than that in summer or winter.

Therefore, the power provider 100 determines the power rate of a period of low power consumption to be less than that of a high power consumption period, determines the power rate of a season of low power consumption to be less than a high power consumption season, and provides power of the determined power rate to each home.

That is, the power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary. In this way, the power provider 100 controls power rates of each home to be elastically adjusted in response to power consumption of each home, and provides the adjusted power to each home, such that demand can be balanced.

The power provider 100 collects power consumption amounts of individual homes classified according to individual power rates, and stores the collected power consumption information according to individual power rates, such that the power-supply company calculates power rates (electricity bills) depending upon power consumption for individual power rate levels of each home per month, and charges each home the calculated electricity bills on a monthly basis.

The power provider 100 compares the periodically calculated monthly power rate (monthly bills) with monthly predetermined power rates so as to decide power bills. If the calculated monthly power rates are higher than the monthly predetermined power rates, information about the excess of the monthly predetermined power rates is transmitted to the power management apparatus 300 installed in the corresponding home, such that an event indicating the excess of monthly predetermined power rates is generated through the power management apparatus 300 installed in each home.

The power provider 100 stores a threshold power amount for each home, compares power consumption amount for each home with a threshold power amount, and thus decides a power limitation amount.

In this way, the power provider 100 manages the power demand of each home on the basis of the threshold power amount or the monthly predetermined power rates.

In this case, the threshold power amount for limiting the power supply of each home may be arbitrarily determined by the power supply company, or may be determined by agreement with the power supply company for each home. In addition, the monthly predetermined power rates of each home are determined by agreement with the power supply company.

The power provider 100 is connected to the smartmeter 200 installed in each home, the power management apparatus 300, and each electric device 400 over a network, such that information regarding power demand management can be transmitted and received over the network. This network may be any of a wired network, a wireless network, a wired/wireless hybrid network, etc.

The smartmeter 200 is installed in each home, and includes a display such as a liquid crystal display (LCD), such that power consumed in each home is displayed in real time. The smartmeter 200 is an electronic meter, which bidirectionally communicates with the power provider 100 and transmits the consumed power amount to the power provider 100 and the power management apparatus 300.

The smartmeter 200 receives power rate information from the power provider 100, displays the received power rate information, and transmits the power rate information to the power management apparatus 300. In addition, the smart meter 200 may further display a price level corresponding to the power rate information upon receiving the power rate information from the power provider 100.

The power management apparatus 300 may also be referred to as an Energy Management System (EMS) or a Demand Response (DR) controller.

The power management apparatus 300 communicates with the smartmeter 200, and thus receives power rate information and power rate level information from the smartmeter 200. In addition, the power management apparatus 300 communicates with the electric device 400 such that it receives power consumption information of the electric device and reservation information from the electric device 400.

The power management apparatus schedules the operation of the electric device 400 on the basis of the power rate level of the power provider 100 and power consumption information of the electric device 400, and controls the operation of the electric device 400 on the basis of the scheduling information.

The power management apparatus 300 may also establish a power level on the basis of power rates upon receiving only the power rates from the power provider 100.

In this case, the power management apparatus 300 collects power rate information, arranges the collected information in descending numerical order of power rate, divides the arranged information into a plurality of ranges, and assigns different power rate levels to the divided ranges such that power rate levels are established.

In this case, the number of the power rate levels may be 2, 3 or more, and each level may have a different power rate.

Let us assume that the number of power rate levels is 4, i.e., a low power rate level, a medium power rate level, a high power rate level, and a critical power rate level. Individual power rate levels have different power rates. The low power rate level is the lowest power rate level, and the critical power rate level is the highest power rate level. Power rate level is proportional to power rate.

The power management apparatus 300 receives information regarding the excess of threshold power and information regarding the excess of the monthly predetermined power rate, and informs the user of the received information.

Referring to FIG. 2, the power management apparatus 300 includes a first communication unit 310, a first controller 320, a first storage unit 330, a first display 340, a first sound unit 350, and a first input unit 360.

The first communication unit 310 receives power rate information from the smartmeter 200 and power rate level information corresponding to the received power rate information from the smartmeter 200 by communicating with the smartmeter 200, and transmits the received information to the first controller 320. The first communication unit 310 receives information of the electric device 400 from the electric device 400 by communicating with the electric device 400, transmits the received information to the first controller 320, receives an operation control signal of the electric device 400 from the first controller 320, and transmits the received operation control signal to the electric device 400.

In this case, the power rate information may be a previous day's officially fixed price received from the power provider 100 or may be a power rate that is received in real time from the power provider 100. In this case, the first controller 320 predicts the future power rate using the past power consumption pattern upon receiving the power rate information in real time.

The first controller 320 stores power consumption information of the electric devices 400 (400a, 400b, 400c) in the first storage unit 330. In this case, the information of the electric device 400 may be a device name, power consumption information, etc. In this case, the power consumption information may be at least one of a maximum instantaneous power amount, average power consumption amount, power consumption time information, etc.

Upon receiving reservation information from at least one electric device 400, the first controller 320 decides the order of operations on the basis of the power consumption information and reservation information of the electric device 400. The first controller 320 performs scheduling to decide a real operation start time in the operation order on the basis of the power rate information, and controls the electric device 400 on the basis of the scheduling result.

In this case, the reservation information is reservation information entered by a user, and may include a reservation registration time, a desired operation time, operation priority, etc.

In more detail, the first controller 320 decides the operation order (i.e., ranking (Pr)) for scheduling on the basis of a reservation registration time (RT), an operation priority (OP), and an operation time (OT) and device power consumption (P) of the electric device, and applies weights (Wx and Ix) to individual items, as denoted by the following equation. In this case, Wx is a weight of the item x, and Ix is an input or set value of the item x.

$$Pr = (W_{RT} \times I_{RT}) + (W_{OP} \times I_{OP}) + (W_{OT} \times I_{OT}) + (W_P \times I_P) \quad \text{[Equation]}$$

If the operation priority (OP) of user input information is high in level, $W_{RT}$ and $W_{OP}$ are established to be higher than $W_{OT}$ and $W_P$, for example, $W_{OT}=0.4$, $W_P=0.4$, $W_{RT}=0.1$, and $W_{OP}=0.1$.

In contrast, if the operation priority (OP) of device power consumption (P) of the electric device 400 is high in level, $W_{OT}$ and $W_P$ are established to be higher than $W_{RT}$ and $W_{OP}$. In this case, each weight may be pre-established, or an optimum value may be established by the machine running.

In addition, the operation start time for the scheduling may be set to a desired operation time when the operation priority (OP) of user input information is set to a maximum value of 1. Otherwise, if the operation priority (OP) is set to zero, the operation start time may be set to a period during which power rates are at their lowest.

The operation start time for scheduling is determined in the operation order when the operation priority (OP) of the device is higher than '0' and less than '1'. In this case, different power rate levels are applied to individual OPs.

For example, if the operation priority (OP) is less than 0.4, the operation start time is searched in a time of a low price level and the searched operation start time is decided. If the operation priority (OP) is in the range from 0.4 to 0.8, the operation start time is searched in a time of low and medium price levels and the searched operation start time is decided. If the operation priority (OP) is higher than 0.8, the operation start time is searched in a time of medium and high price levels and the searched operation start time is decided.

The scheduling of such electric devices 400 (400a, 400b, 400c) will hereinafter be described with reference to FIG. 3.

Referring to FIG. 3, if the first controller 320 receives reservation information (including reservation registration time (10 AM, 9 Oct. 2010), a desired operation completion time (9 AM, 10 Oct. 2010), and operation priority of 0.3) from the washing machine 400a having an ID '1', it confirms the received information and stores the confirmed information in a log column.

In addition, if the first controller 320 receives reservation information (including reservation registration time (7:25 PM, 9 Oct. 2010), a desired operation completion time (4 PM, 10 Oct. 2010), and operation priority of 0.9) from the air-conditioner 400b having an ID '2', it confirms the received information and stores the confirmed information in a remarks column.

The first controller 320 decides the operation order on the basis of the reservation information of the electric device having an ID of 1 and reservation information of the other electric device having an ID of 2. In the case of the electric device having an ID of 1, an actual operation start time of the electric device having the ID of 1 is decided in a time of a low price level. In the case of the electric device having an ID of 2, an actual operation start time of the electric device having the ID of 2 is decided in the low, medium and high price levels.

The first controller 320 controls the first display 340 to display the scheduling result.

The first controller 320 decides a power rate level (i.e., price level) corresponding to a power rate, and determines a time of the critical price level to be a reservation blocked time.

In addition, the first controller 320 predicts maximum instantaneous power on the basis of the scheduling result. The first controller 320 compares the predicted maximum instantaneous power with allowed instantaneous power, and determines a time in which the predicted maximum instantaneous power is equal to or higher than the allowed instantaneous power to be a reservation blocked time.

Upon receiving the operation blocked time information from the electric device 400, the first controller 320 stores the received information, and excludes the operation blocked time when deciding the actual operation time.

In addition, the first controller 320 compares the actual operation start time corresponding to the scheduling result of each electric device 400 with the desired operation time, calculates a difference between the two times, and displays the calculated result, so as to provide the user with an option to select the actual operation start time. In addition, the difference may also be provided to the corresponding electric device as necessary.

The first controller 320 calculates monthly accumulated power consumption amount and monthly electricity bills on the basis of the scheduling result. The first controller 320 controls the first display 340 to display the monthly accumulated power consumption amount and the monthly electricity bills.

The first controller 320 compares the monthly accumulated power consumption with the monthly predetermined power consumption. If the monthly accumulated power consumption is close to or higher than the monthly predetermined power consumption, the first controller 320 controls the first display 340 and the first sound unit 350, and informs the user of the result thereof. In addition, the first controller 320 compares the monthly accumulated electricity bills with the monthly predetermined electricity bills. If the monthly accumulated electricity bill is close to or higher than the monthly predetermined power rate, the first controller 320 controls the first display 340 and the first count unit 350, and informs the user of the controlled result.

In this way, the first controller 320 performs scheduling to decide the actual operation start time of each electric device in consideration of power consumption information of each electric device and the power rates, such that it can perform optimum scheduling in consideration of electricity bills (cost) and user convenience (usability).

The first controller 320 determines the presence or absence of duplicate reservation of electric devices. If a duplicate reservation is detected, the first controller 320 generates a duplicate reservation event.

The first controller 330 stores power consumption information (including maximum instantaneous power, average power consumption, and a power consumption time indicating a total operation time), and further stores reservation information (such as a reservation registration time, a desired operation time, operation priority (OP), and the like).

The first storage unit 330 stores a weight for each item to decide the operation order of each electric device, an OP for each electric device, a power rate threshold for each OP, and/or a power rate level for each OP.

For example, if the OP is less than 0.4 and the power level threshold is less than a low level, and the OP is in the range from 0.4 to 0.8, this means that the price level threshold is a medium level or less, and the determined price level threshold is stored in the first storage unit 330. If the OP is greater than or equal to 0.8, the price level threshold is less than a high level or less.

The first storage unit 330 stores the past power consumption pattern to predict future power rate. If each electric device is driven, the first storage unit 330 stores an actual power consumption time.

The first storage unit 330 stores user information. In this case, user information includes the monthly predetermined electricity bills, allowed instantaneous power, and personal user information. The monthly predetermined power rates may be changed by the user.

The first display 340 displays the current power rate, the current power rate level, power rates for each hour of each day, power rate levels for each hour of each day, a currently operating electric device and a reserved electric device to be driven, and further displays the monthly accumulated electricity bills and the monthly accumulated power consumption corresponding to the scheduling result.

The first display 340 may also display allowed instantaneous power. In this case, the allowed instantaneous power may be set to different values during individual periods.

The first display 340 will hereinafter be described with reference to FIGS. 4A to 4C.

Figure 4A:
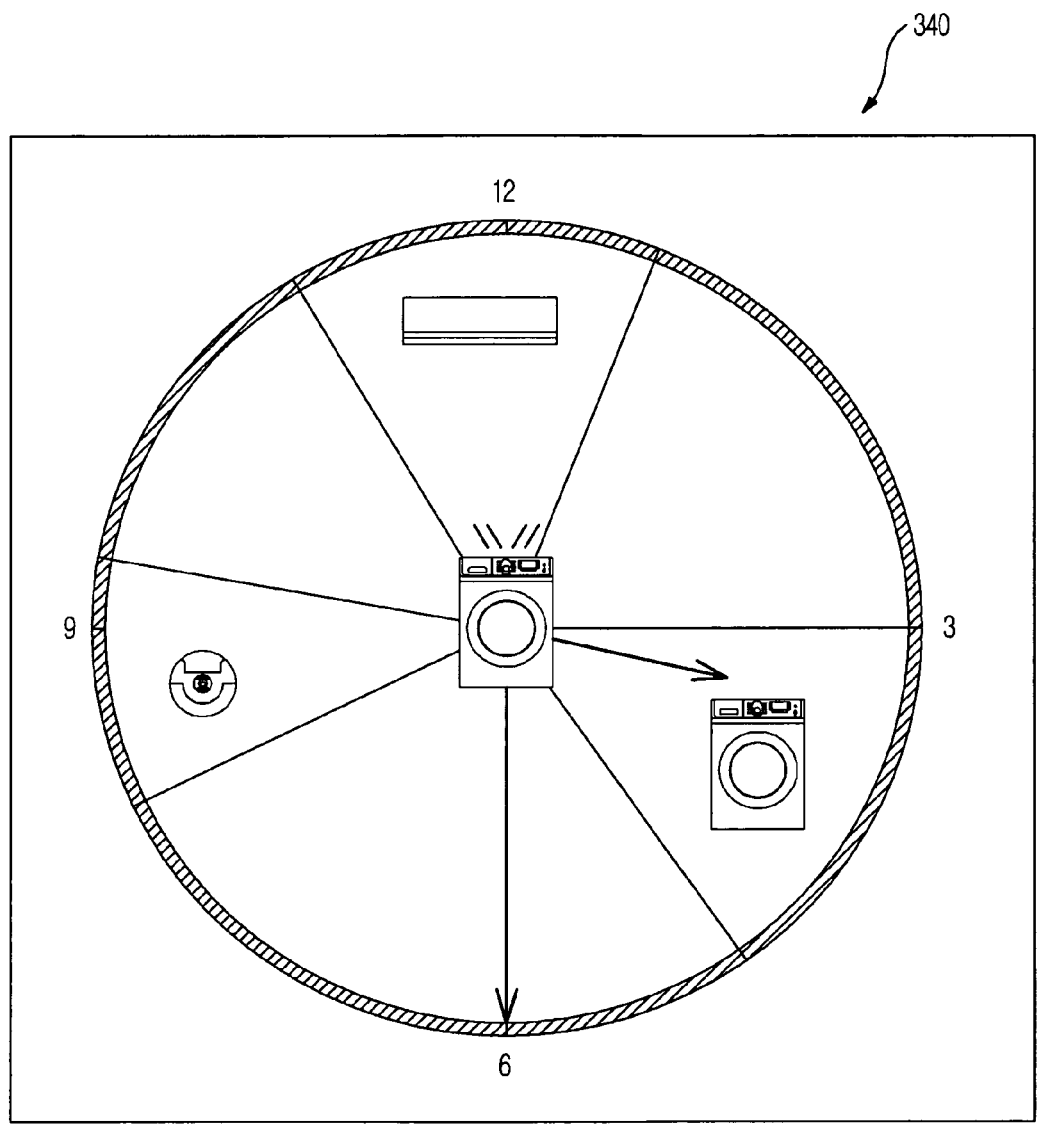
FIGS. 4A to 4C exemplarily show the power management apparatus contained in the power management system according to one embodiment.

Referring to FIG. 4A, the first display 340 includes a circular clock window and displays a current time (3 hours 30 minutes).

The edge of the circular clock window may be displayed in a color corresponding to the current power rate or the current power rate level. In this case, individual power rates or individual power rate levels are assigned to different colors. For example, if the power rate level is low, the edge of the low power rate level is displayed in green. If the power rate level is medium, the edge of the medium power rate level is displayed in yellow. If the power rate level is high, the edge of the critical power rate level is displayed in red. If the power rate level is critical, the edge of the critical power rate level is displayed in blue. For example, the current time is set to 03:30, the edge of the circular clock window is displayed in green.

The electric device corresponding to the scheduling result is displayed in a circular clock window. In response to the scheduling result, a total operation time from the actual operation start time to the actual operation completion time of each electric device is displayed. In this case, the total operation time indicates a power consumption time of the electric device, and is substantially equal to an actual power consumption time.

Individual periods of circular clock window are assigned electric devices corresponding to the scheduling result. In this case, the currently operating electric device may be displayed at the center of the circular clock window so that it can be readily distinguished from the non-operating electric device, or may flash in the corresponding period.

Figure 4B:
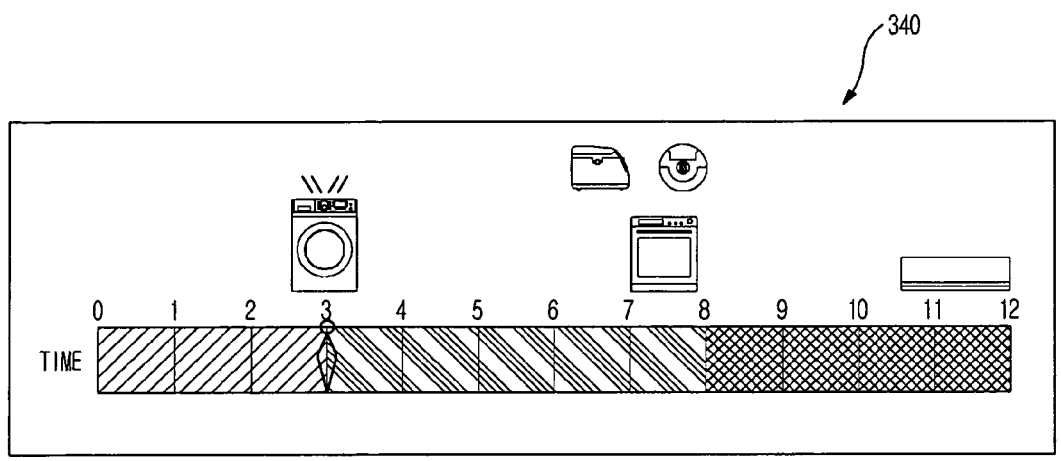

Referring to FIG. 4B, the first display 340 may be a bar clock window that displays a current time (3:00).

The inner regions of the bar clock window may be displayed in a color corresponding to power rates for each time zone or power rate levels for each time zone. In this case, individual power rates or individual power rate levels are assigned to different colors. For example, if the power rate level is low, the color corresponding to the low power rate level is green. If the power rate level is medium, the color corresponding to the medium power rate level is yellow. If the power rate level is high, the color corresponding to the high power rate level is red. If the power rate level is critical, the color corresponding to the critical power rate level is blue.

In addition, the electric device corresponding to the scheduling result is displayed at the exterior of the bar clock window. In this case, the corresponding electric device is displayed at a time at which the actual operation start time of each electric device is displayed. In addition, the currently operating electric device is displayed so as to be easily distinguished from the non-operating electric device. For example, the currently operating electric device may be displayed in dark color or be flashed.

Figure 4C:
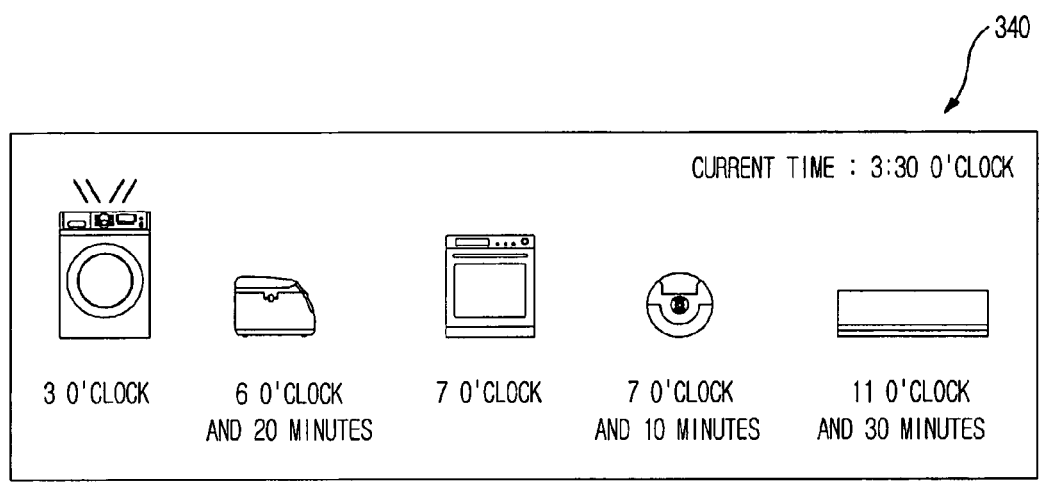

Referring to FIG. 4C, the first display 340 has a digital clock window and displays a current time (3 hours 30 minutes).

The current time of the digital clock window may be displayed in a color corresponding to the current power rate or the current power rate level. In this case, the individual power rate levels or the individual power rate levels have different colors.

The inner regions of the digital clock window display individual electric devices corresponding to the scheduling result. The actual operation start time of each electric device is displayed at one side of electric device. In this case, the actual operation start time of each electric device may be displayed in a color corresponding to each power rate or each power rate level.

For example, the operation start time of the washing machine is 3 AM, which is a low power rate level period, such that 3 AM is displayed in green. The operation start time of the electric rice cooker is set to 06:20 AM, the operation start time of the electric oven is set to 7 AM, and the charging start time of the robot cleaner is set to 07:10 AM, such that the above-mentioned operation start times belong to the medium power rate level. As a result, 06:20 AM and 07:10 AM are displayed in yellow. In addition, the operation start time of the air-conditioner is set to 11:30 AM, this power rate level is critical, such that 11:30 AM is displayed in blue.

In addition, the currently operating electric device is displayed so as to be easily distinguished from the non-operating electric device. For example, the currently operating electric device may be displayed in dark color or be flashed.

The first sound unit 350 outputs information about the currently operating electric device as a sound signal. The monthly accumulated electricity bill that will be assessed when all the reserved electric devices are operated is audibly output, such that the user can easily recognize the monthly accumulated electricity bills.

The first sound unit 350 audibly outputs an event indicating the excess of allowed instantaneous power, an event indicating the excess of monthly predetermined power consumption, and an event indicating the excess of monthly electricity bills, such that the user can easily recognize the above-mentioned events.

The first input unit 360 receives the user's personal information and the user's monthly predetermined electricity bills, and transmits the received information to the first controller 320.

After the first input unit 360 receives information of an electric device selected by the user, it receives reservation information of the corresponding electric device 400, and transmits reservation information of the user-input electric device 400 to the first controller 320. In this case, if reservation information of the electric device 400 is input, a reservation information message is displayed on the first display 340. The first input unit 360 receives information corresponding to the displayed message from the user as an input.

If necessary, in order to reserve the operation of an electric device, an operation time of which is not yet established, the first input unit 360 may further receive information about a power consumption time indicating a total operation time during which the corresponding electric device is operated.

The first input unit 360 may also receive weights of individual items deciding the operation order as necessary. That is, in response to the received weight, it is determined whether user-input reservation information has priority or power consumption information of the electric device has priority.

The first input unit 360 may further receive an operation blocked time of the electric device 400 as an input. In this case, the operation blocked time of the electric device 400 may be transmitted to the first controller 320.

The first input unit 360 is integrated with the first display 340, thereby forming a touchscreen.

The electric device 400 may be any one of a washing machine 400a, an air-conditioner 400b, a refrigerator 400c, a dryer, a dish washer, a television, a kimchi refrigerator, an audio device, a personal computer, a laptop, a lamp, a hair dryer, a mobile terminal, an electric charger of a digital device such as a digital camera, a stove, an electric rice cooker, an electric oven, a robot cleaner, a printer, etc.

The electric device 400 transmits a predetermined electric device name, power consumption information, etc. to the power management apparatus 300. In this case, the power consumption information is power consumption information determined when the electric device is initially operated. The power consumption information may be at least one of maximum instantaneous power, average power consumption and power consumption time information indicating a power consumption time.

In more detail, the power consumption information of the electric device (such as a washing machine, a dryer, or a dish washer) having a predetermined power consumption time for each function is at least one of the maximum instantaneous power, average power consumption, and the power consumption time.

In addition, the power consumption information of the electric device (such as an air-conditioner or a refrigerator), the power consumption time of which is not permitted, is at least one of the maximum instantaneous power, average power consumption, and average power consumption time information. In the above-mentioned electric device, the average power consumption and the average power consumption time may be obtained on the basis of the past power consumption information or may be directly received from the user.

Since the user must select the operation algorithm, it is impossible to establish the operation mode. In addition, power consumption information of the electric device (such as a stove or printer), the power consumption time of which cannot be established, is at least one of maximum instantaneous power and average power consumption information.

If the electric device 400 includes a plurality of operation modes, the power consumption information of this electric device has power consumption information for each operation mode. In this case, the average power consumption and the power consumption time are decided by the operation algorithm, and the power consumption information for each operation mode is predetermined when the electric device is manufactured. The actual power consumption for each operation mode may be measured and updated as necessary. In this case, the operation mode may be further established by the user as necessary.

A detailed description of this will hereinafter be described with reference to FIGS. 5A and 5B.

FIG. 5A exemplarily shows power consumption information and operation algorithm information of individual operation modes of the washing machine 400a. FIG. 5B exemplarily show power consumption information and operation algorithm information of individual operation modes of the air-conditioner.

Referring to FIG. 5A, the washing machine includes three operation modes (a first mode, a second mode, and a third mode).

The first mode, the second mode, and the third mode of the washing machine correspond to different functions of the washing machine. As the operation level gradually moves from the first mode to the third mode, the operation algorithm becomes simpler. Accordingly, as the operation level gradually moves from the first mode to the third mode, the maximum instantaneous power and the average power consumption are reduced, and the power consumption time is also reduced.

That is, in the case of the washing machine, different operation algorithm functions (e.g., washing, rinsing, and dehydrating times, the number of repetitions, water temperature, and motor speed) are applied, such that there may arise a difference in power consumption.

Referring to FIG. 5B, the air-conditioner 400b has four operation modes (first mode, second mode, third mode, and fourth mode).

The first to fourth modes of the air-conditioner have different operation algorithms. As the operation level gradually moves from the first mode to the fourth mode, the operation algorithm can reduce the maximum instantaneous power and the average power consumption.

That is, in the case of the air-conditioner, different operation algorithm functions (e.g., an indoor unit filter operation, an outdoor unit frequency, an indoor unit SP (Super Purification) operation, an indoor unit driving, etc.) are applied, such that there may arise a difference in power consumption.

The electric device 400 receives reservation information from the user as an input, transmits the received reservation information to the power management apparatus 300, and is operated on the basis of the scheduling result of the power management apparatus 300.

Referring to FIG. 2, the electric device 400 includes a second storage unit 410, a second controller 420, a second communication unit 430, a second input unit 440, a second display 450, a second sound unit 460, and a power metering unit 470.

The second storage unit 410 stores the electric device name, maximum instantaneous power, average power consumption, maximum power consumption time, and operation algorithm information, and further stores maximum instantaneous power for each function constructing the operation algorithm, the average power consumption, and the power consumption time. In this case, if it is impossible to establish the power consumption time, this power consumption time is stored as 'NA'. In this case, if the electric device has a plurality of operation modes, the second storage unit 410 stores power consumption information for each operation mode.

In addition, the maximum instantaneous power, the average power consumption, and the power consumption time may be provided by the manufacturer of the electric device, or may be measured in real time according to the execution of the corresponding operation algorithm and may also be updated as necessary.

The second storage unit 410 may store high-usability reservation information or the latest reservation information as necessary.

The second controller 420 extracts an electric device name and power consumption information stored in the second storage unit 410 upon receiving a signal for additionally registering the electric device 400 in the power management apparatus 300, and transmits the extracted information to the power management apparatus 300. In this case, if the electric device has a plurality of operation modes, the second controller 420 transmits power consumption information for each operation mode to the power management apparatus 300.

The second controller 420 displays a difference between the actual operation start time corresponding to the scheduling result of the power management apparatus 300 and the desired operation time and a difference between individual power rates on the second display 450, such that the user is provided with the option to confirm or cancel the scheduling result, and controls the operation on the basis of the user selection. In this case, if the desired operation time is a desired operation completion time, a total operation time indicating the power consumption time is deducted from the desired operation completion time, such that the desired operation start time is calculated and then compared with the actual operation start time.

That is, the second controller 420 provides the option to the user such that the user can operate the electric device at an operation start time corresponding to the scheduling result, can operate the electric device at an operation start time indicated by the user after overriding the scheduling result, and can determine whether to perform re-scheduling by changing the weight or the operation priority (OP).

The second controller 420 can analyze a reservation information pattern to acquire high-usability reservation information, can generate and display a button having the acquired reservation information, or can generate and display a button having the latest reservation information.

This reservation information may be established and displayed by a default without receiving an input signal from the user according to characteristics of the electric device, or may be automatically updated and displayed through the machine running.

The second controller 420 confirms the presence or absence of a duplicate reservation. If a duplicate reservation is found, the second controller 420 generates a duplicate reservation event.

The second communication unit 430 transmits information of the electric device 400 to the first communication unit 310 of the power management apparatus 300 upon receiving an indication message from the second communication unit 430, and transmits the actual operation start time information transmitted from the first communication unit 310 of the power management apparatus 300 to the second controller 420.

The second input unit 440 receives reservation information or an operation command from the user, and transmits a signal corresponding to the received signal to the second controller 420.

Figure 6:
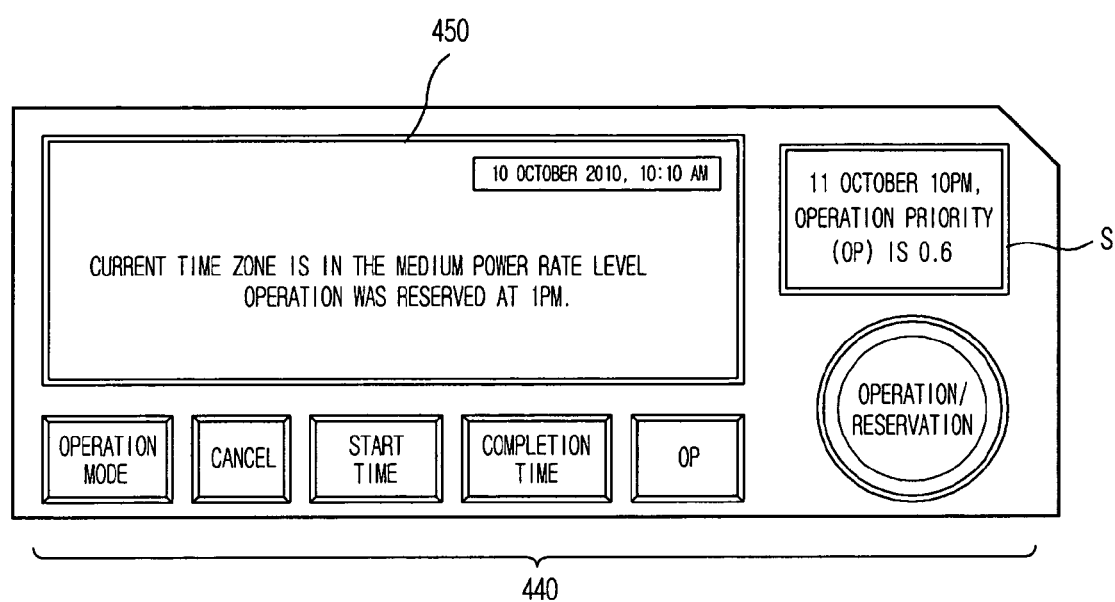
FIG. 6 exemplarily shows a display of the electric device contained in the power management system according to one embodiment.

In this case, the reservation information may include a reservation registration time, a desired operation time, an operation priority (OP), etc., and the second input unit 440 includes operation mode, cancel, start time, completion time, operation priority (OP) buttons, and a button for commanding the operation/reservation functions as shown in FIG. 6.

In this case, the reservation registration time may be a specific time at which the reservation operation of the electric device is registered, is automatically generated when the reservation registration of the electric device is made, and is used when deciding the operation order. The desired operation time may be a desired operation start time at which the electric device starts operation or a desired operation completion time at which the electric device finishes operation. The operation priority (OP) indicates the urgency or importance assigned by the user, and higher values thereof correspond to greater urgency or importance. For example, the OP may be set to a real number from 0 to 1.

In addition, if there are several operation modes, the operation mode button is activated such that any one of the operation modes can be input to the power management apparatus.

In addition, the second input unit 400 may further include an operation time button in the electric device, the operation time of which is not yet established, such that the user may directly input the operation time as necessary.

If the second input unit 440 is implemented as a touchscreen, it generates an operation mode selection button for displaying an operation algorithm in response to the input of the option mode button, generates a button for displaying items capable of being canceled in response to the input of the cancellation button, generates a button for displaying a number in response to the input of the start time, the completion time, and the OP button, and generates an input completion button.

In addition, the second input unit 440 may further include a numeric keypad via which the user can enter an operation mode, a start time, a completion time, and an operation priority (OP) as necessary. Also, repeated selection of the operation mode button, the start time button, the completion time button, and the OP button may be set to enable numeric input through the second input unit 440. In this case, the reservation information message for commanding the user to enter reservation information may be displayed on the second display 450.

In addition, the second input unit 440 may include a button 'S' having high-usability reservation information. Further, the second input unit 440 may further include a button having the latest reservation button.

The second display 450 displays current date and time as shown in FIG. 6. In addition, the second display 450 displays a current power rate or a current power rate level, and displays the actual operation start time according to the scheduling result.

The second display 450 displays a reservation information message that allows the user to reserve a desired operation, and displays the input results of the operation mode button, the cancel button, the start time button, the completion time button, and the OP button.

In addition, if the second display 450 is implemented as a touchscreen and the option mode button is entered, the option mode selection button for displaying the operation algorithm is displayed. If the start time button, the completion time button, and the OP button are entered, the number buttons and the input completion button are displayed, and an information message for the button input operation are displayed.

In addition, if the second display 450 is implemented as a touchscreen, the S button having high-usability reservation information is generated and displayed. In addition, a button having the latest reservation information may be generated and displayed as necessary.

If the electric device is operated, the second display 450 may display an operation mode and an operation state of the electric device.

In addition, the second display 450 may also display not only a difference between the actual operation start time depending upon the scheduling result and the desired operation time, but also a difference between individual prices as necessary.

The second display 450 displays the duplicate reservation event when two or more duplicate reservation events occur in a given day, and thus provides an option to the user.

The second sound unit 460 outputs a sound signal at the actual operation start time and the actual operation completion time of the electric device, such that the user is informed that the electric device has begun operation.

If the electric device 400 is operated, the power metering unit 470 measures the power of the electric device 400 in real time, and transmits the measured power to the second controller 420. It is thus possible to detect the actual power consumed by the electric device 400 and to update power consumption information for each operation mode stored in the second storage unit 410.

The power metering unit 470 measures the power using not only a voltage detected at both ends of the AC power line connected to the power connector of the electric device 400 but also a current detected from any one of the AC power lines connected to the power connector.

Figure 7:
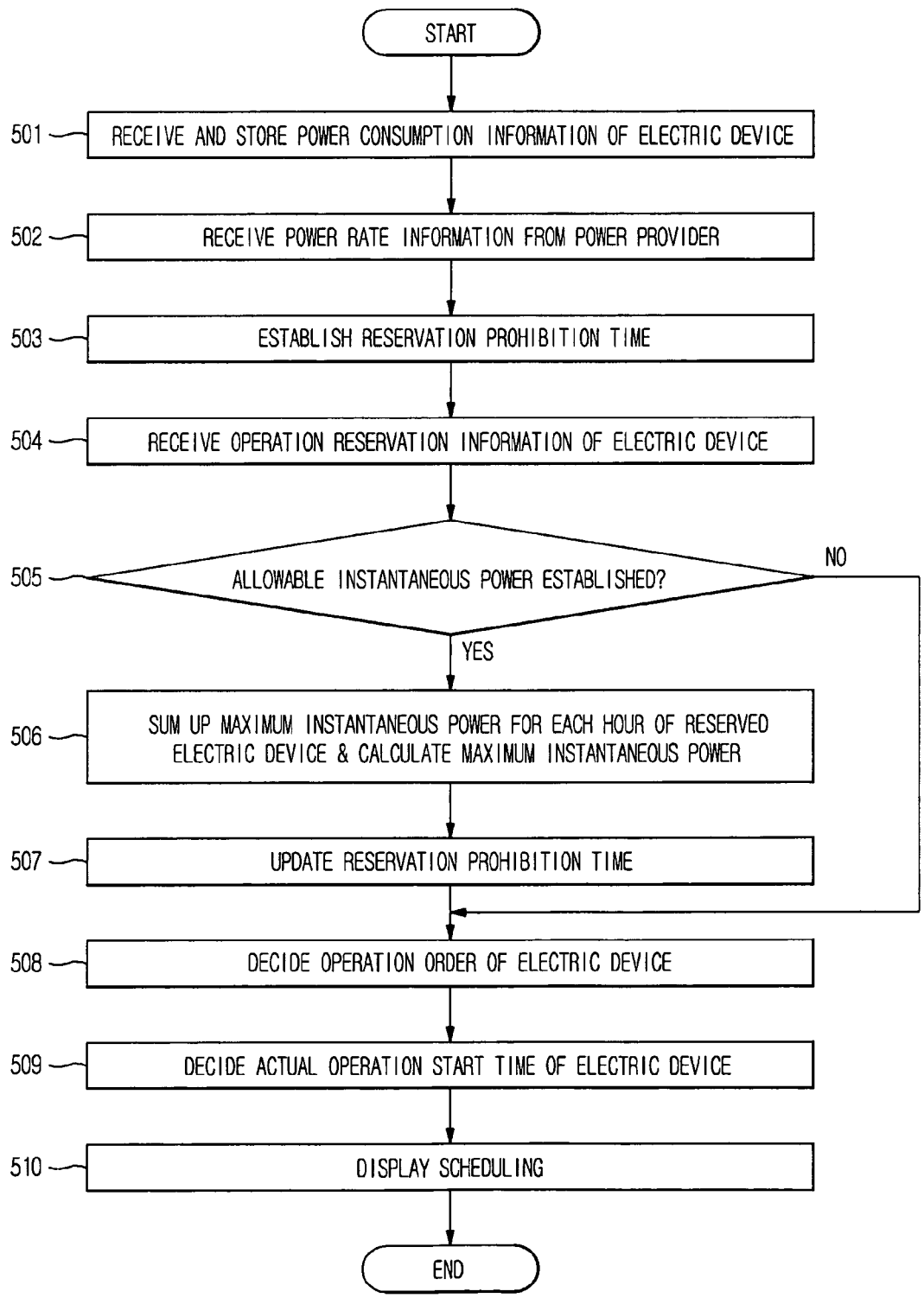
FIGS. 7 and 8 are flowcharts illustrating the power management apparatus contained in the power management system according to an embodiment.

FIG. 7 is a flowchart illustrating a method for controlling the power management apparatus according to one embodiment. The operations shown in FIG. 7 will hereinafter be described with reference to FIGS. 8 to 10.

The power management apparatus 300 communicates with the electric device 400 such that it receives information from the electric device 400 and stores the received information at operation 501. In this case, information of the electric device 400 may be device name information, power consumption information, etc.

The power management apparatus 300 assigns an ID to the corresponding electric device when the information of the electric device is stored, and further stores the corresponding ID, device name, and power consumption information. In this case, the power consumption information may be at least one of maximum instantaneous power, average power consumption, and power consumption time.

In more detail, assuming that the electric device is a washing machine or a dryer having a predetermined power consumption time for each function, the power consumption information may be at least one of maximum instantaneous power, average power consumption, and power consumption time. Assuming that the electric device is an air-conditioner or a refrigerator, the power consumption time of which cannot be established, the power consumption information may be at least one of maximum instantaneous power and average power consumption.

In this case, if the electric device is unable to establish its own power consumption time, the power consumption time is obtained when the average power consumption time is calculated on the basis of the past power consumption time, or may be directly entered by the user.

In addition, if there are several operation modes in the electric device, power consumption information is differently established according to each operation mode. In this case, the operation mode may be predetermined when the electric device is manufactured, and may be additionally established by the user.

The power management apparatus 300 receives power rate information from the power provider 100 at operation 502. In this case, the power rate information may be notified at the previous day, or may be notified in real time.

In this case, the previous day's notification power rate information is power rate information that is provided during the 24 hours of the current day at a predetermined time of the previous day. The real-time notification power rate information is current power rate information that is provided in real time during the 24 hours of the current day.

In this case, if the power rate information is provided in real time, the power management apparatus 300 predicts the future power rate on the basis of the past power consumption pattern. In accordance with the embodiment of the present invention, an exemplary case in which the power provider provides the previous day's notification power rate information will hereinafter be described.

The power management apparatus 300 may further receive the power rate level for each power rate from the power provider 100 as necessary. If the power management apparatus 300 receives only the power rate information from the power provider 100, the power management apparatus 300 decides a power rate level for each power rate on the basis of the received power rate information. In this case, the power rate level for each power rate may be predetermined. In accordance with the embodiment of the present invention, four power rate levels (Low, Medium, High, and Critical) will be exemplarily described in the following.

The power management apparatus 300 determines a time having the highest power rate to be a reservation blocked time on the basis of the power rate information at operation 503, and updates the predetermined reservation blocked time information. In this case, a power rate level of the highest power rate is identical to the critical power rate level.

In addition, the reservation blocked time may also be set to a time having a specific power rate level as necessary, or may be set to a time having a predetermined power rate level or higher. For example, the reservation blocked time may be set to a time having a predetermined power rate (e.g., ₩ 120/kWh or higher) or may be set to a time in which the monthly accumulated electricity bills are identical to or higher than the monthly predetermined electricity bills (e.g., ₩ 100000 or higher).

In the case where the predetermined monthly electricity bill is ₩ 100000, this indicates a relatively high budget. In more detail, the user who selects the relatively high budget may desire to operate electric devices without reducing the power rate at a desired operation time under the condition that the power rate is high.

In this case, the reservation blocked time is established on the basis of the allowed instantaneous power instead of the power rate information. In contrast, if the user selects a small budget, the reservation blocked time is established on the basis of the power rate information.

Upon receiving reservation information from at least one electric device 400 at operation 504, the power management apparatus 300 stores the received reservation information of the electric device 400. In this case, the power management apparatus 300 may further receive and store power consumption information.

In this case, reservation information of the electric device is input by the user who operates the input unit 440 of the electric device 400. In this case, the electric device 400 receives at least one reservation information of a desired operation time, an operation priority (OP), and an operation mode. In this case, the desired operation time is a desired operation start time at which the user wishes to operate the electric device 400 or a desired operation completion time at which the user wishes to finish operating the electric device 400.

The electric device 400 includes a reservation registration time generated by the input of reservation information in the reservation information, and transmits the resultant reservation information to the power management apparatus 300. This reservation information relates to a user preference corresponding to the operation of the electric device 400.

When the user enters reservation information, the user directly manipulates a latest reservation information button and a high-usability reservation information button that are contained in the electric device, such that the operation of the electric device 400 can be easily reserved.

In addition, the power management apparatus 300 may select any one of electric devices, and may enter reservation information of the selected electric device as necessary, resulting in the increased user convenience.

The power management apparatus analyzes a desired operation time and the OP for operating the electric device using the machine learning, such that the electric device can be automatically reserved using a minimum amount of information as necessary.

The power management apparatus 300 confirms the duplicate reservation for each electric device. If the electric device of the duplicate reservation is present, the power management apparatus 300 displays reservation information of the duplicate reservation electric device, and informs the user of the reservation information.

If the allowed instantaneous power is established at operation 505, the power management apparatus 300 adds maximum instantaneous power for each hour of the reserved electric device and maximum instantaneous power of the electric device having received the reservation information, and calculates maximum instantaneous power for each hour using the added result at operation 506.

The power management apparatus 300 compares the calculated maximum instantaneous power for each hour with the allowed instantaneous power, confirms a specific time at which the maximum instantaneous power is larger than the allowed instantaneous power, determines the confirmed time to be a reservation blocked time, and updates the predetermined reservation blocked time information at operation 507, such that it can prevent the reservation of more operations of the electric device.

In addition, characters are displayed on the first display 340 of the power management 300, or a sound signal is output through the first sound unit 350, such that the user can easily recognize the characteristics or the sound signal.

The power management apparatus 300 extracts information needed for scheduling from the first storage unit 330.

That is, the power management apparatus 300 extracts power consumption information and reservation information for each pre-scheduled electric device, and also extracts power consumption information and reservation information of the currently reserved electric device. In this case, if there is an operation mode in the reservation information, the power management apparatus 300 extracts power consumption information corresponding to the operation mode.

In this case, the power consumption information may include maximum instantaneous power, average power consumption, and a power consumption time. The power consumption information may include a reservation registration time, a desired operation time, and operation priority (OP).

The power management apparatus 300 decides the operation order of the electric device at operation 508, and decides the operation start time of the electric device on the basis of the decided operation order at operation 509.

In more detail, when deciding the operation order of the electric device, the operation order (ranking (Pr)) is calculated on the basis of a reservation registration time (RT), an operation priority (OP), a total operation time (OT), and power consumption (P), different weights (Wx and Ix) are reflected to individual items. In this case, Wx is a weight of the item x, and Ix is an input or set value of the item x.

$$Pr=(W_{RT} \times I_{RT})+(W_{OP} \times I_{OP})+(W_{OT} \times I_{OT})+(W_P \times I_P)$$ [Equation]

If the operation priority (OP) of user input information is high in level, $W_{RT}$ and $W_{OP}$ are established to be higher than $W_{OT}$ and $W_P$, for example, $W_{OT}=0.4$, $W_P=0.4$, $W_{RT}=0.1$, and $W_{OP}=0.1$.

In contrast, if the operation priority (OP) of power consumption information of the electric device is high in level, $W_{OT}$ and $W_P$ are established to be higher than $W_{RT}$ and $W_{OP}$.

In this case, the weight may be set to a fixed value, or may be set to an optimum value by the machine running.

A method for deciding the operation start time of the electric device at operation 509 will hereinafter be described with reference to FIG. 8.

Figure 8:
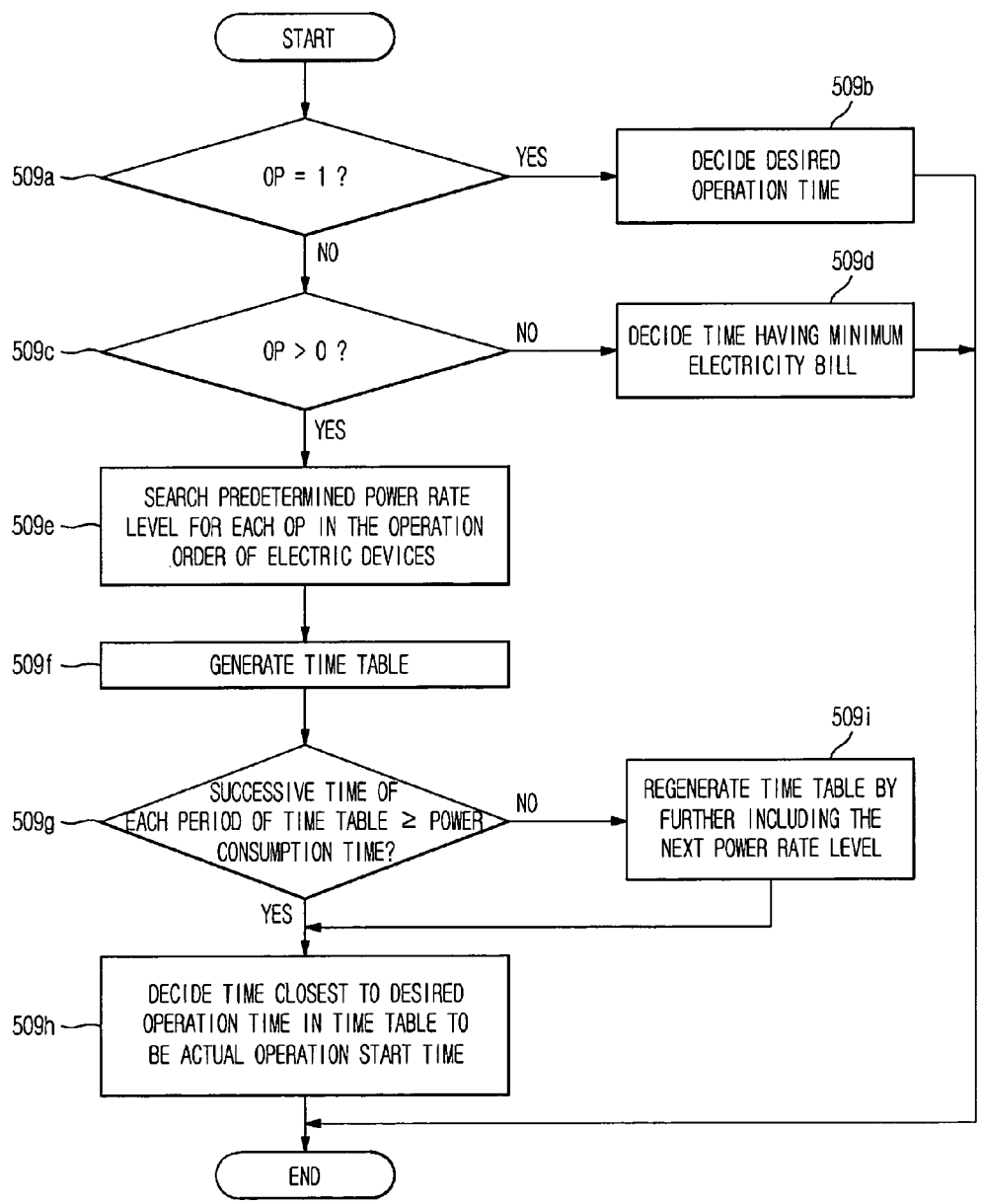

Referring to FIG. 8, the power management apparatus 300 decides whether the OP of the user-input electric device is a maximum value of 1 at operation 509*a*. In this case, if the OP is set to the maximum value of 1, the power management apparatus 300 decides the actual operation start time to be a desired operation time at operation 509*b*. In this case, if the desired operation time is the desired operation completion time, a power consumption time indicating a total operation time is subtracted from the desired operation completion time, such that the desired operation start time is calculated and the calculated desired operation start time is determined to be the actual operation start time.

Subsequently, the power management apparatus 300 decides whether the OP is higher than a maximum value of 0 at operation 509*c*. In this case, if the OP is set to a minimum value of 0, the power management apparatus 300 searches for a time having a minimum electricity bill, and determines the searched time to be the actual operation start time at operation 509*d*.

In contrast, if the OP is higher than zero, the power management apparatus 300 determines the actual operation start time in the operation order. In this case, the power management apparatus 300 applies different power rate level thresholds according to operation priorities. That is, the power management apparatus 300 confirms a predetermined power rate level threshold for each OP of each electric device 400 at operation 509*e*.

In this case, a predetermined power rate level threshold for each OP of each electric device is set to a low power rate level when the OP is less than 0.4. If the OP is in the range from 0.4 to 0.8, the power rate level threshold is set to the medium power rate level. If the OP is higher than 0.8, the power rate level threshold is set to a high power rate level.

The power management apparatus 300 searches for an operation permitted time under a predetermined power rate level threshold for each OP.

That is, if the OP is less than 0.4, the power management apparatus 300 searches for an operation permitted time in a time of a low power rate level or less. If the OP is in the range from 0.4 to 0.8, the power management apparatus 300 searches for the operation permitted time in a time of a medium power rate level or less (i.e., low and medium power rate levels). If the OP is higher than 0.8, the power management apparatus 300 searches for an operation permitted time in a time of a high power rate level or less (i.e., low, medium and high power rate levels).

The power management apparatus 300 excludes a reservation blocked time and an operation blocked time from the next operation permitted time, thereby generating a time table at operation 509*f*.

The power management apparatus 300 determines whether a successive time of each period of the time table is identical to or longer than a power consumption time at operation 509*g*. In this case, if the successive time of each period of the time table is longer than the power consumption time of the electric device, a time closest to the desired operation time in the time table is decided to be an actual operation start time of the corresponding electric device at operation 509*h*. In this case, if the successive time of each period of the time table is identical to or longer than the power consumption time of the electric device, a time closest to the desired operation time in the time table is decided to be an actual operation start time of the corresponding electric device at operation 509*h*.

If the desired operation time is a desired operation completion time, the power consumption time is deducted from the desired operation completion time to acquire a desired operation start time, and decides a specific time closest to the acquired desired operation start time to be an actual operation start time in such a way that the power management apparatus 300 performs scheduling. A detailed description thereof will hereinafter be described with reference to FIGS. 9A to 9C.

Figure 9A:
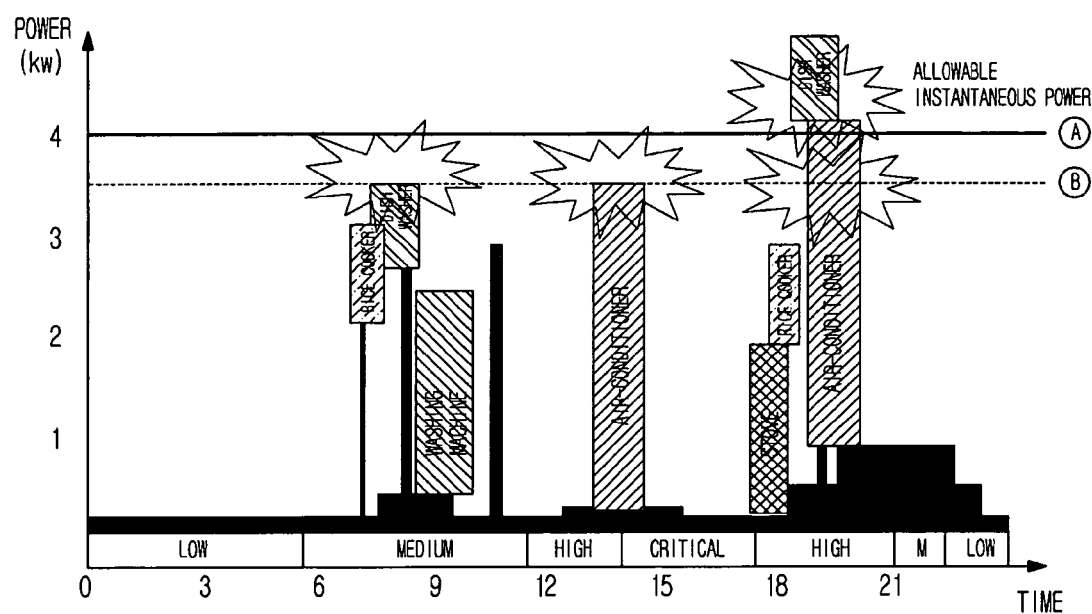
FIGS. 9A to 9C exemplarily show the scheduling of the power management apparatus contained in the power management system according to an embodiment.

FIG. 9A shows reservation situations of several electric devices entered by the user according to individual hours. If the allowed instantaneous power A is set to 4 kW, it can be easily recognized that the maximum instantaneous power between 6 PM and 8 PM is higher than the allowed instantaneous power. In addition, if the allowed instantaneous power B is set to 3.5 kW, it can be recognized that the maximum instantaneous power encountered between 7 PM and 9 PM, between 1 PM and 3 PM, or between 6 PM and 8 PM is higher than the allowed instantaneous power.

Figure 9B:
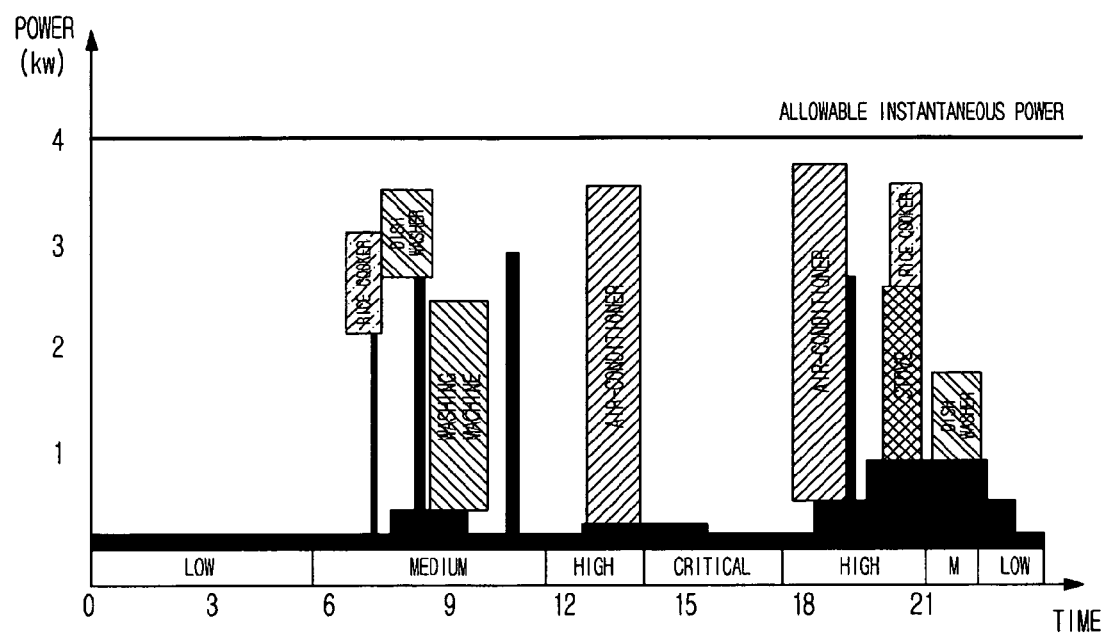

FIG. 9B shows the scheduling result of several electric devices when the allowed instantaneous power A is set to 4 kW. As can be seen from FIG. 9B, it can be easily recognized that a specific time in which the maximum instantaneous power exceeds the allowed instantaneous power is not present.

As can be seen from the scheduling result, the actual operation time is decided in the operation order, such that the actual operation times of individual electric devices (i.e., an air-conditioner, a dish washer, a stove, and an electric rice cooker) reserved in the afternoon.

In more detail, the actual operation time of the air-conditioner reserved at 6:50 PM is adjusted to be 5:50 PM. The actual operation time of the stove reserved at 5:20 PM is adjusted to be 8 PM. The actual operation time of the electric rice cooker reserved at 5:50 PM is adjusted to be 8:10 PM. The actual operation time of the dish washer reserved at 6:25 PM is adjusted to be 9:05 PM.

Figure 9C:
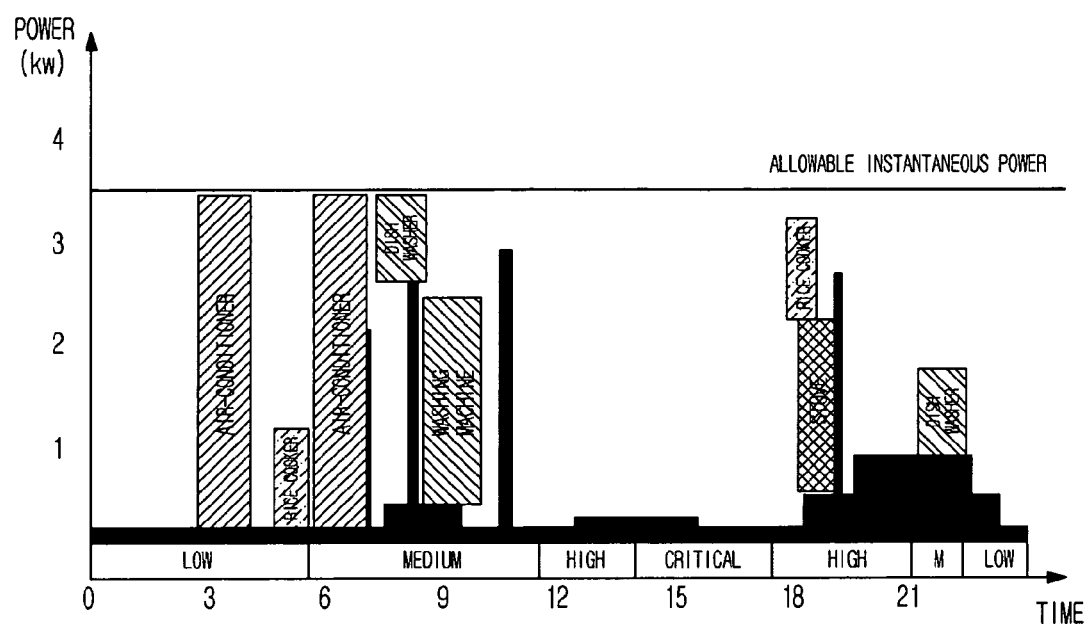

FIG. 9C shows the scheduling result of several electric devices when the allowed instantaneous power B is set to 3.5 kW. As can be seen from FIG. 9C, it can be easily recognized that a specific time in which the maximum instantaneous power exceeds the allowed instantaneous power is not present.

As can be seen from the scheduling result, the actual operation time is decided in the operation order, such that it can be recognized that the actual operation times of the remaining electric devices (i.e., an air-conditioner, an electric rice cooker, a dish washer, and a stove) other than the dish washer and the washing machine that are reserved to be operated in the morning are adjusted.

On the other hand, if a successive time of each period of the time table is less than a power consumption time of the electric device, it is impossible to decide an operation start time of the electric device, such that a predetermined power rate level threshold for each OP of the corresponding electric device is increased by one step so as to schedule each undecided electric device, and the time table is regenerated using the increased power rate level at operation 509*i*.

Next, it is determined whether a successive time of each period of the regenerated time table is identical to or longer than the power consumption time of the electric device at operation 509*g*. In this case, if the successive time of each period of the regenerated time table is longer than the power consumption time of the electric device, the power management apparatus 300 decides an operation start time of the corresponding electric device at a time closest to the desired operation time in the regenerated time table at operation 509*h*.

If several actual operation start times are decided, a time having the lowest electricity bills is determined to be an actual operation start time. A detailed description thereof will hereinafter be described with reference to FIGS. 10A and 10B.

Figure 10A:
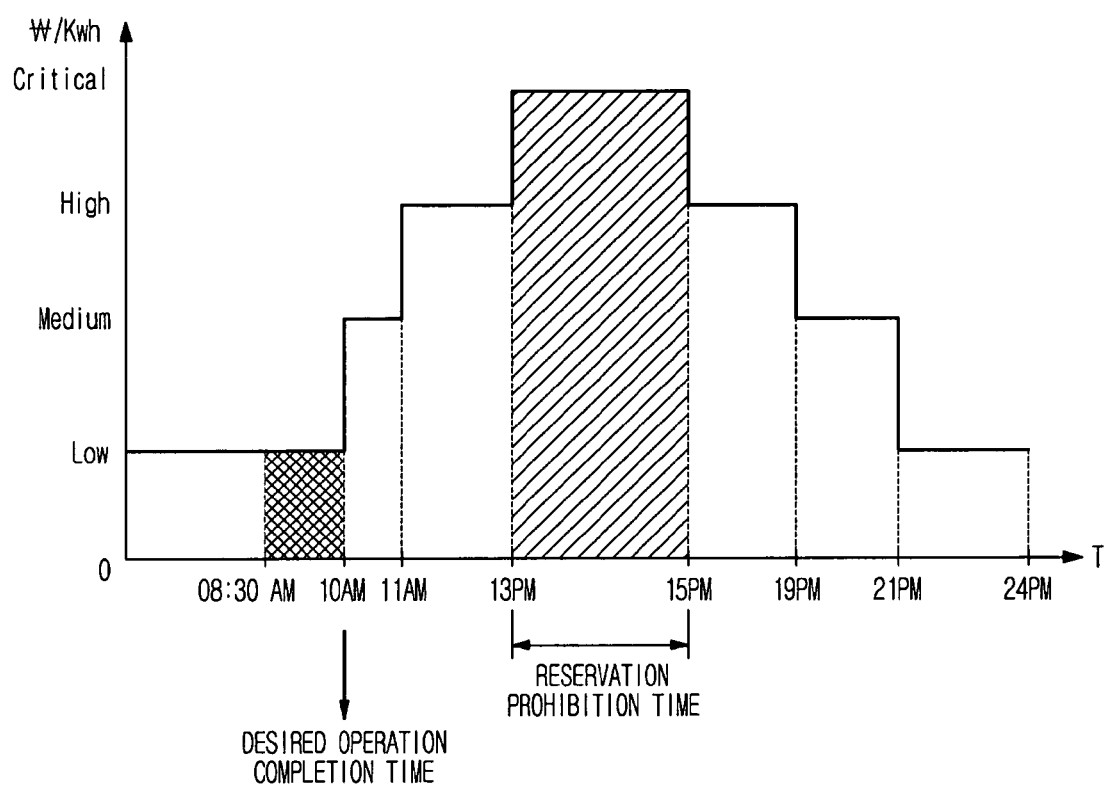
FIGS. 10A and 10B exemplarily show the scheduling of the power management apparatus contained in the power management system according to an embodiment.

As can be seen from FIG. 10A, if the operation of the washing machine is reserved at a desired operation completion time of 10 AM, a power consumption time of 90 minutes, and an OP of 0.3, the power management apparatus 300 generates a time table on the basis of power rate information and reservation information.

That is, a time of the critical power rate level is set to a reservation blocked time, and a low power rate level is searched in the remaining time other than the reservation blocked time, such that a time table is generated using the searched time. In this case, since the OP is 0.3 belonging to the low power rate level, a time table of 0 AM (midnight) to 10 AM or a time table of 9 PM to 12 PM is generated.

In this case, the desired operation completion time is set to 10 AM. The desired operation start time is set to 8:30 AM obtained when 90 minutes are deducted from 10 AM indicating a desired operation completion time.

A time of 8:30 AM or a time closest to 8:30 AM in the next time table is determined to be the actual operation time, such that the operation of the desired operation completion time is completed. In this case, since the desired operation start time and the desired operation completion time are present in the time table, a desired operation start time desired by the user is determined to be an actual operation start time.

Figure 10B:
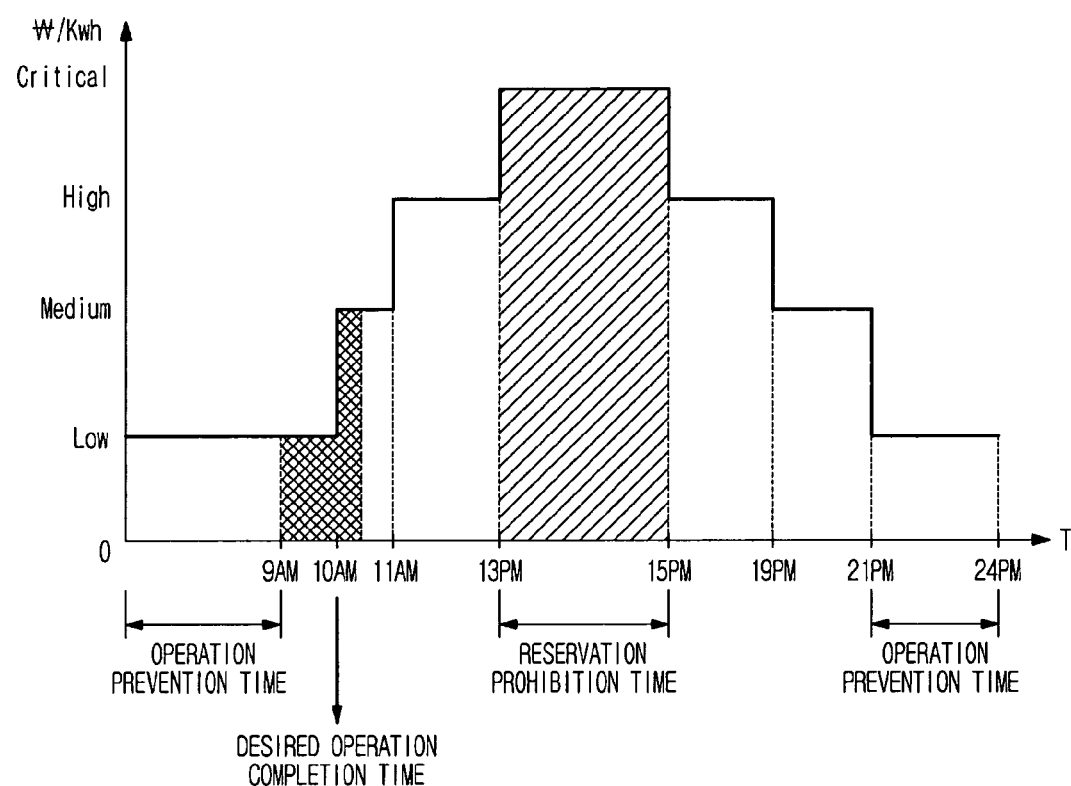

On the other hand, as shown in FIG. 10B, if the operation blocked time of the washing machine is set to the time period of 0 AM to 9 AM or the time period of 9 AM to 12 AM, a time table between 9 AM and 10 AM or a time table between 9 PM and 12 PM is generated.

In this case, the desired operation completion time of the washing machine is set to 10 AM. 8:30 AM obtained when 90 minutes are deducted from 10 AM serving as the desired operation completion time or 9 PM is set to an actual operation start time.

However, a time period from 0 AM to 9 AM or a time period from 9 PM to 12 PM is set to an operation blocked time, such that there is only one operation permitted time from 9 AM to 10 AM. That is, the operation reservation of the washing machine cannot be scheduled in such a way that a successive time of each period of the time table is less than the power consumption time, the power rate level is increased by one step, and a time in which a power rate level is medium or less is searched so that the time table is generated using the searched time. In this case, the time table may be set to a period from 0 AM to 11 AM or a period from 7 PM to 9 PM.

The desired operation completion time of the washing machine is set to 10 AM, 9 AM (at which the washing machine can stop operation) close to 10 AM serving as the desired operation completion time is determined to be an actual operation start time. The washing machine starts operation at 9 AM, and stops operation at 10:30 AM.

Likewise, the power management apparatus schedules all the reserved electric devices using power consumption information and reservation information of the electric devices.

A time of the execution of such scheduling is performed when power consumption information received from the power provider is updated or is compulsorily executed by the user.

The power management apparatus 300 displays the scheduling result at operation 510, such that the user can easily recognize the scheduling result.

In addition, the power management apparatus 300 transmits the scheduling result to each electric device. As a result, each electric device controls the second display 450 to display an operation start time at which the electric device is to be operated.

Therefore, the user confirms the scheduling result through the power management apparatus 300 or the electric device 400, such that the user may accept or disregard the scheduling result.

If the operation of the electric device is not reserved at a user-desired operation time, the power management apparatus 300 may induce the user selection as necessary. IN this case, the power management apparatus 300 may inform the user of the reason that the operation of the corresponding electric device is not reserved at a desired operation time, and may recommend a reservation time to the user as necessary. For example, the desired operation time for reserving the operation of the corresponding electric device may further inform the user of a high power rate level or a reservation blocked time.

If the user disregards the scheduling result, the scheduling may be re-performed.

In this case, the operation priority (OP) is changed to be higher than the current OP, such that the electric device can be operated at a time closer to the user desired operation time. The OP is changed to a maximum value of 1, such that the electric device may be operated at a user-desired operation time.

In addition, a weight is changed so that the scheduling result may also be changed as necessary.

In addition, if the user does not desire to operate the electric device at the scheduled time, the power management apparatus 300 ignores the user intention and allows the user to directly reserve the operation of the electric device at a desired operation time. In this case, the increased electricity bills may also be notified of the user.

The power management apparatus 300 updates the monthly accumulated power consumption when the operation start time of the electric device is decided.

In addition, the electricity bill based on the scheduled result and the other electricity bill based on the unscheduled result are calculated, the calculated electricity bills are notified of the user, and the electricity bills may also be used as variables for estimating the algorithm performance.

As described above, upon receiving an operation reservation request of the electric device from the user, the power management apparatus receives reservation information from the user, and decides the operation start time of the electric device, resulting in an increase in user satisfaction.

If the current power rate assessed in response to the current power consumption is close to the monthly electricity bill, or if the monthly accumulated electricity bill exceeds the monthly predetermined electricity bill, the power management apparatus 300 informs the user of the above-mentioned situation using characters or sound.

In addition, the power management apparatus 300 properly controls the operation start times of several electric devices according to power rate levels, such that it can effectively operate each electric device 400 and can reduce power consumption.

As is apparent from the above description, the power management apparatus, the power management system including the same, and a method for controlling the same according to an embodiment of the present invention can perform optimum scheduling of an electric device using power rate information provided from the power provider, and power consumption information and reservation information of the electric device, resulting in an increase in user satisfaction.

In addition, the energy efficiency of the user's side can be maximized, resulting in reduction in electricity bills.

In addition, the embodiment can optimize the operation of the electric device under a plurality of restriction conditions, such as allowed instantaneous power, monthly established electricity bills, threshold power, etc.

The embodiment may establish a blocked time of the reservation operation of the electric device on the basis of power rate information, establishes a reservation blocked time on the basis of maximum instantaneous power consumption information of the reserved electric device, informs the user of the reservation blocked time, such that the user's convenience can be increased when the operation of the electric device is reserved.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power management apparatus comprising:
    a communication unit to receive power rate information from a power provider and receive power consumption information and user-input reservation information from an electric device; and
    a controller to decide an operation order of the electric device on the basis of the power consumption information and the reservation information, perform scheduling to decide an operation start time on the basis of the power rate information and the operation order, and control an operation time of the electric device on the basis of the scheduling result,
    wherein each item of the power consumption information and the reservation information is weighted when the operation order is decided,
    wherein the controller decides the operation order by determining a future power rate based on a past power consumption pattern of the electric device and the power rate information, and
    wherein the controller further decides the operation order based on an operation mode comprising an operation algorithm function, a power consumption amount, and a power consumption time for the electric device, and the controller selects the operation mode from a plurality of operation modes wherein the electric device comprises an ability to perform more than one operation mode, the plurality of the operation modes comprising different operation algorithm functions, power consumption amounts, and power consumption times.

2. The apparatus according to claim 1, wherein the reservation information includes a reservation registration time, a desired operation time, and an operation priority (OP).

3. The apparatus according to claim 2, wherein the desired operation time is any one of a desired operation completion time at which the electric device stops operation and a desired operation start time at which the electric device starts operation.

4. The apparatus according to claim 2, wherein the power consumption information includes at least one of a maximum instantaneous power, an average power consumption, and a power consumption time of the electric device.

5. The apparatus according to claim 4, wherein the controller decides the operation order on the basis of the reservation registration time, the operation priority (OP), the average power consumption, and the power consumption time.

6. The apparatus according to claim 2, wherein the controller confirms a predetermined power rate level threshold for each of a plurality of operation priorities (OPs), confirms an operation permitted time at a time having a power rate less than the power rate level threshold to generate a time table, and decides a time closest to the desired operation time from among the time table to be an actual operation start time.

7. The apparatus according to claim 6, wherein the controller compares and calculates a difference between the actual operation start time and a desired operation start time and displays the calculated difference.

8. The apparatus according to claim 1, wherein the controller decides a power rate level corresponding to the power rate information.

9. The apparatus according to claim 1, wherein the controller establishes a reservation blocked time on the basis of the power rate information.

10. The apparatus according to claim 1, wherein the controller compares a maximum instantaneous power for each hour with an allowed instantaneous power on the basis of the scheduling result, and determines a reservation blocked time according to the comparison result.

11. The apparatus according to claim 1, further comprising:
    an input unit to receive the reservation information of the electric device.

12. The apparatus according to claim 1, further comprising:
    a display to display the scheduling result.

13. The apparatus according to claim 12, wherein the display includes a clock window, an edge of the clock window being displayed in a color corresponding to the power rate information, and the electric device is displayed in the clock window on the basis of the scheduling result.

14. The apparatus according to claim 13, wherein the display displays a currently-operating electric device and a currently non-operating electric device in different ways.

15. The apparatus according to claim 12, wherein the display includes a clock window, an inner region of the clock window being displayed in a color corresponding to the power rate information, and the electric device is displayed at an exterior of the clock window on the basis of the scheduling result.

16. The apparatus according to claim 15, wherein the display displays a currently-operating electric device and a currently non-operating electric device in different ways.

17. The apparatus according to claim 12, wherein the display displays the electric device and an actual operation start time on the basis of the scheduling result, and allows the actual operation start time to be displayed in a color corresponding to the power rate information.

18. The apparatus according to claim 17, wherein the display displays a currently-operating electric device and a currently non-operating electric device in different ways.

19. A method for controlling a power management apparatus comprising:

receiving power rate information from a power provider;
receiving and storing power consumption information and user-input reservation information from an electric device;
deciding an operation order of the electric device on the basis of the power consumption information and the reservation information of the electric device;
performing scheduling to decide an actual operation start time on the basis of the power rate information and the operation order; and
controlling an operation time of the electric device on the basis of the scheduling result,
wherein each item of the power consumption information and the reservation information is weighted when the operation order is decided,
wherein the deciding the operation order comprises determining a future power rate based on a past power consumption pattern of the electric device and the power rate information, and
wherein the deciding of the operational order is further based on an operation mode comprising an operation algorithm function, a power consumption amount, and a power consumption time for the electric device, the operation mode being selected from a plurality of operation modes wherein the electric device comprises an ability to perform more than one operation mode, the plurality of the operation modes comprising different operation algorithm functions, power consumption amounts, and power consumption times.

20. The method according to claim 19, wherein the reservation information includes a reservation registration time, a desired operation time, and an operation priority (OP).

21. The method according to claim 20, wherein the power consumption information includes at least one of a maximum instantaneous power, an average power consumption, and a power consumption time of the electric device.

22. The method according to claim 21, wherein the deciding of the actual operation start time includes:
if the operation priority (OP) is a maximum value, deciding a desired operation time to be the actual operation start time.

23. The method according to claim 21, wherein the deciding of the actual operation start time includes:
if the operation priority (OP) is a minimum value, deciding a specific time having a minimum power rate to be the actual operation start time.

24. The method according to claim 20, wherein the deciding of the actual operation start time includes:
confirming a predetermined power rate threshold for each of a plurality of operation priorities (OPs);
confirming a power rate less than a power rate threshold, and generating a time table according to the confirmed result; and
confirming a specific time closest of the time table to a desired operation time from among the reservation information, and determining the confirmed time to be the actual operation start time.

25. The method according to claim 24, wherein the generating of the time table includes:
establishing a reservation blocked time on the basis of the power rate information; and
generating the time table by excluding the reservation blocked time.

26. The method according to claim 24, wherein the generating of the time table includes:
confirming an operation blocked time of the electric device; and
generating the time table by excluding a reservation blocked time.

27. The method according to claim 24, wherein the generating of the time table includes:
generating the time table by excluding a reservation blocked time in which a maximum instantaneous power exceeds a predetermined allowed instantaneous power.

28. The method according to claim 24, wherein the generating of the time table includes:
if a successive time is shorter than the power consumption time in the time table, regenerating the time table by including a power rate subsequent to a current power rate; and
determining the actual operation start time in the regenerated time table.

29. The method according to claim 28, further comprising:
upon receiving a request signal indicating a start of operation of another electric device from the user, performing rescheduling on the basis of power consumption information of the another electric device.

30. The method according to claim 19, further comprising:
calculating a maximum instantaneous power for each hour on the basis of the scheduling result;
comparing the maximum instantaneous power with a predetermined allowed instantaneous power;
determining a specific time in which the maximum instantaneous power exceeds the predetermined allowed instantaneous power to be a reservation blocked time; and
displaying the reservation blocked time.

31. The method according to claim 19, further comprising:
determining a presence or absence of a duplicate reservation in a same time period; and
if a duplicate reservation is found, displaying the duplicate reservation information.

32. The method according to claim 19, further comprising:
determining a power rate level on the basis of the received power rate information.

33. The method according to claim 19, further comprising:
calculating a monthly accumulated electricity bill or a monthly accumulated power consumption on the basis of the scheduling result; and
displaying the monthly accumulated electricity bill or the monthly accumulated power consumption.

34. A power management system comprising:
an electric device to store power consumption information, and user-input receive reservation information as an input; and
a power management apparatus which receives power rate information from a power provider, receives the power consumption information and the reservation information from an electric device, decides an operation order of the electric device on the basis of the power consumption information and the reservation information, performs scheduling to decide an operation time on the basis of the power rate information and the operation order, and controls an operation time of the electric device on the basis of the scheduling result,
wherein each item of the power consumption information and the reservation information is weighted when the operation order is decided,
wherein the power management apparatus decides the operation order by determining a future power rate based on a past power consumption pattern of the electric device and the power rate information, and
wherein power management apparatus further decides the operation order based on an operation mode comprising an operation algorithm function, a power consumption amount, and a power consumption time for the electric device, and the power management apparatus selects the operation mode from a plurality of operation modes wherein the electric device comprises an ability to perform more than one operation mode, the plurality of the operation modes comprising a different operation algorithm functions, power consumption amounts, and power consumption times.

35. The power management system according to claim 34, wherein the reservation information includes a reservation registration time, a desired operation time, and an operation priority (OP), and the electric device includes an input unit to receive the desired operation time and the operation priority (OP), a controller to confirm a registration time of the reservation information, and a display to display the scheduling result.

36. The power management system according to claim 35, wherein the input unit of the electric device receives an operation blocked time as an input.

37. The power management system according to claim 35, wherein the reservation information includes the operation mode.

38. The power management system according to claim 37, wherein the electric device includes:

a storage unit to store a plurality of operation algorithm information and power consumption information of individual operation modes corresponding to the individual operation algorithm information; and a controller to perform an operation control using the operation algorithm corresponding to the operation mode at the actual operation start time.

39. The power management system according to claim 37, wherein the electric device analyzes a reservation information pattern on the basis of past reservation information, and displays reservation information corresponding to the analyzed reservation information pattern.

40. The power management system according to claim 37, herein the electric device displays a latest reservation information.

* * * * *